(12) United States Patent
Takakuwa et al.

(10) Patent No.: US 11,105,350 B2
(45) Date of Patent: Aug. 31, 2021

(54) SENSOR MOUNTING TOOL

(71) Applicant: SMC CORPORATION, Chiyoda-ku (JP)

(72) Inventors: Youji Takakuwa, Kitakatsushika-gun (JP); Mitsuru Machijima, Matsudo (JP); Shiori Iwatsuki, Saitama (JP); Kenta Onuki, Tsukuba (JP)

(73) Assignee: SMC CORPORATION, Chiyoda-ku (JP)

( * ) Notice: Subject to any disclaimer, the term of this patent is extended or adjusted under 35 U.S.C. 154(b) by 506 days.

(21) Appl. No.: 15/765,292

(22) PCT Filed: Oct. 5, 2016

(86) PCT No.: PCT/JP2016/079579
§ 371 (c)(1),
(2) Date: Apr. 2, 2018

(87) PCT Pub. No.: WO2017/061451
PCT Pub. Date: Apr. 13, 2017

(65) Prior Publication Data
US 2018/0283417 A1    Oct. 4, 2018

(30) Foreign Application Priority Data

Oct. 8, 2015   (JP) .............................. JP2015-200167

(51) Int. Cl.
*F15B 15/28* (2006.01)
*F16B 2/08* (2006.01)
(Continued)

(52) U.S. Cl.
CPC ...... *F15B 15/2892* (2013.01); *F15B 15/2861* (2013.01); *F16B 2/08* (2013.01); *G01D 11/30* (2013.01)

(58) Field of Classification Search
CPC ........ F15B 15/2892; F15B 15/28; F16B 2/08; F16L 3/11; F16L 3/1211; F16L 3/137
(Continued)

(56) References Cited

U.S. PATENT DOCUMENTS 3,241,800 A * 3/1966 Richter, III ............... F16B 2/08
248/230.9
5,906,302 A * 5/1999 Spergel ................. A62C 13/78
224/250
(Continued)

FOREIGN PATENT DOCUMENTS

JP        63-045403 U     3/1988
JP        07317966 A *   12/1995 ............ F16L 3/2431
(Continued)

OTHER PUBLICATIONS

Title: "Drain Depot"; URL: https://www.draindepot.co.uk/80mm-ppc-anthracite-grey-round-steel-downpipe-bracket.html; Date: Sep. 6, 2015 (Year: 2015).*
(Continued)

*Primary Examiner* — Jill E Culler
*Assistant Examiner* — Ruben C Parco, Jr.
(74) *Attorney, Agent, or Firm* — Oblon, McClelland, Maier & Neustadt, L.L.P.

(57) ABSTRACT

A sensor mounting tool includes: a rail-shaped sensor holder having a first side wall in which a first connection hole is formed; a band part that has a first projection part, and that is formed to be wound on the outer peripheral surface of a cylinder tube; and a fastening mechanism that is for fastening the band part, and that is arranged at a position shifted away from the sensor holder on the outer peripheral surface of the cylinder tube.

20 Claims, 21 Drawing Sheets

(51) Int. Cl.
*F16L 3/11* (2006.01)
*G01D 11/30* (2006.01)

(58) Field of Classification Search
USPC ..... 73/866.5; 248/228.8, 230.9, 229.17, 74.3
See application file for complete search history.

(56) References Cited

U.S. PATENT DOCUMENTS

| | | |
|---|---|---|
| 7,963,208 B2 | 6/2011 | Terasaki |
| 2013/0263733 A1 | 10/2013 | Machijima et al. |

FOREIGN PATENT DOCUMENTS

| | | |
|---|---|---|
| JP | 2001-221206 A | 8/2001 |
| JP | 2012-122591 A | 6/2012 |
| JP | 2012-132499 A | 7/2012 |
| RU | 2 555 094 C2 | 7/2015 |

OTHER PUBLICATIONS

International Search Report dated Dec. 20, 2016 in PCT/JP2016/079579, filed on Oct. 5, 2016.
Indian Office Action dated Apr. 22, 2020, in Patent Application No. 201847016362, 5 pages.
Office Action dated Apr. 4, 2019 in corresponding Russian Patent Application No. 2018117152 (with English Translation), 12 pages.

\* cited by examiner

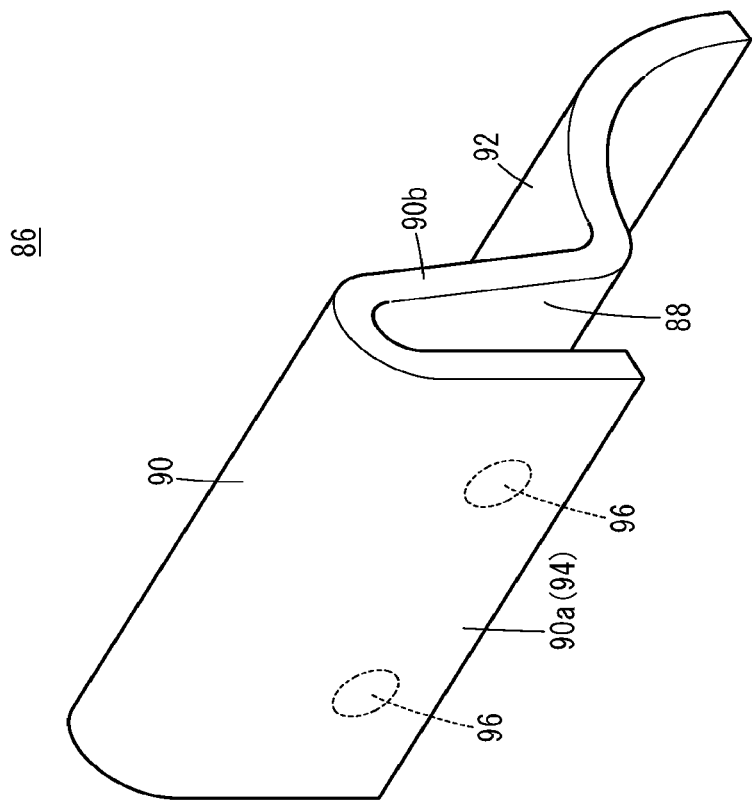
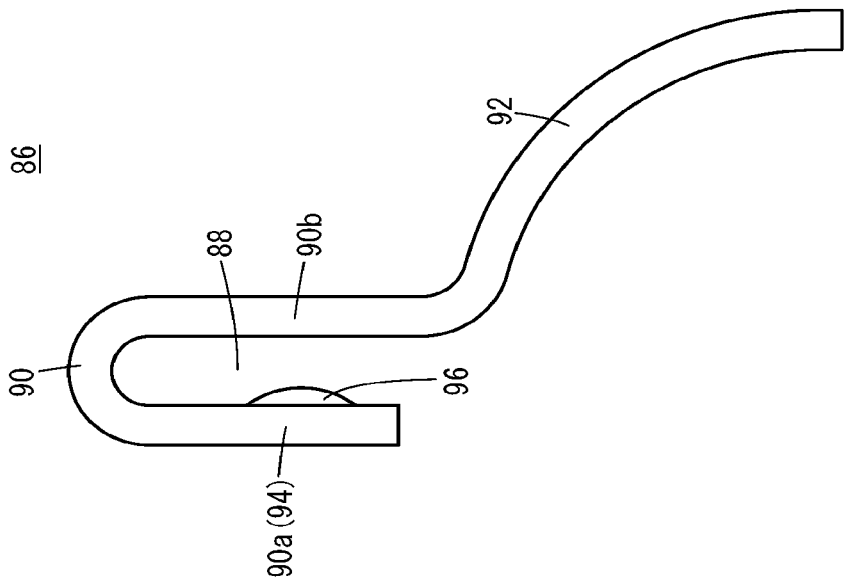

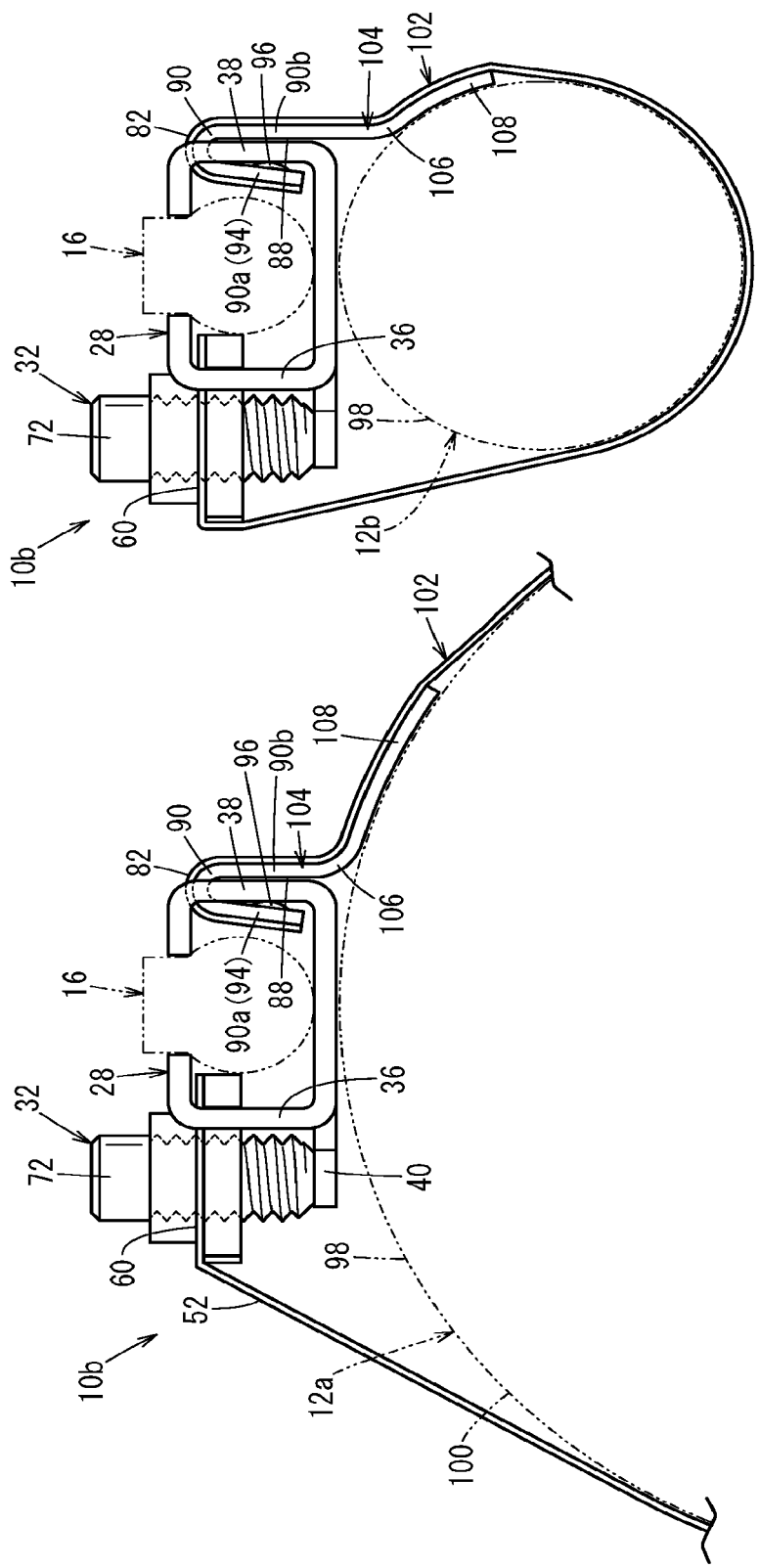

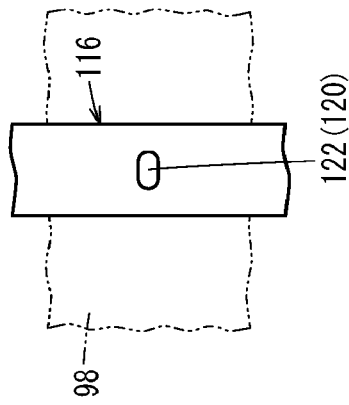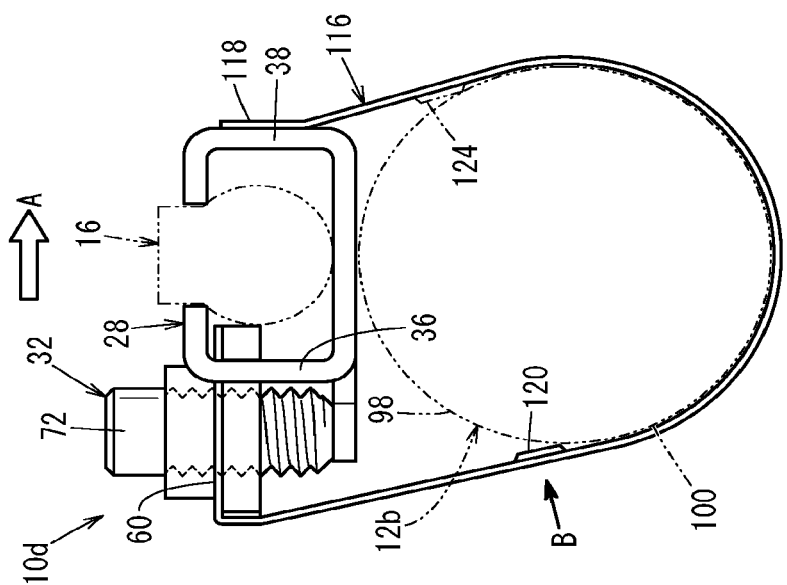

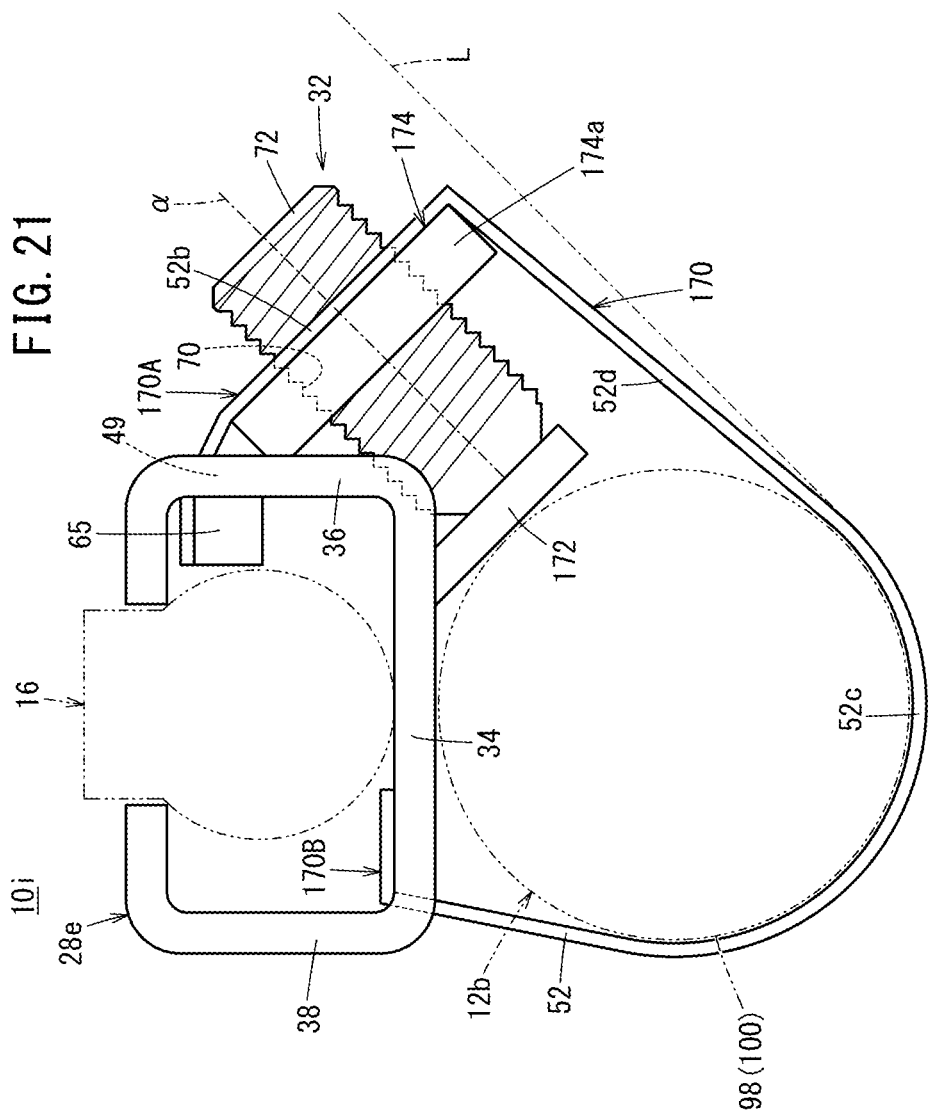

SENSOR MOUNTING TOOL

TECHNICAL FIELD

The present invention relates to a sensor fixture (sensor mounting tool) for attaching a sensor to an outer peripheral surface of a cylinder tube.

BACKGROUND ART

Heretofore, a position sensor for detecting the position of a piston disposed inside a cylinder tube is attached to an outer peripheral surface of a fluid pressure cylinder such as an air cylinder or the like. For example, Japanese Laid-Open Patent Publication No. 2012-122591 discloses a sensor fixture for attaching such a position sensor on an outer peripheral surface of a cylinder tube.

The sensor fixture (device fixture) disclosed in Japanese Laid-Open Patent Publication No. 2012-122591 is equipped with an attachment band arranged along the outer peripheral surface of the cylinder tube, and a metal fitting formed integrally with the position sensor and on which both end portions of the attachment band are hooked. The attachment band is provided with a fastening portion formed by folding a part of the attachment band, a fastening screw is inserted into an insertion hole formed in each folded piece of the fastening portion, and a nut is screw-engaged with the fastening screw that passes through the insertion hole.

SUMMARY OF INVENTION

In the above conventional sensor fixture, both end portions of the attachment band are hooked on the metal fitting formed integrally with the sensor. Thus, in order to adjust the attachment position of the position sensor relative to the cylinder tube, it is necessary to displace the attachment band relative to the cylinder tube. Therefore, work for adjusting the attachment position of the sensor relative to the cylinder tube is cumbersome, and is desired to be improved. Further, it is desired that the sensor fixture should have small bulging portions from the outer peripheral surface of the cylinder tube and should have a compact structure.

The present invention has been made with such problems taken into consideration, and it is an object of the present invention to provide a sensor fixture capable of easily adjusting the attachment position of a sensor relative to a cylinder tube and having a compact structure.

In order to attain the foregoing object, according to the present invention, there is provided a sensor fixture for attaching a sensor to an outer peripheral surface of a cylinder tube, the sensor fixture including a rail-shaped sensor holder having a sensor insertion groove configured to accommodate and hold the sensor in a position-adjustable manner and further having a first sidewall and a second sidewall facing each other, a band portion having a band end portion configured to be connected to the sensor holder, the band portion being configured to be wound around the outer peripheral surface of the cylinder tube, and a fastening mechanism disposed on the outer peripheral surface of the cylinder tube and at a position shifted from the sensor holder, the fastening mechanism being configured to fasten the band portion, wherein the first sidewall includes a connection hole configured to receive the band end portion, and the band end portion includes a protrusion configured to be engaged with an inside surface of the first sidewall.

According to the sensor fixture of the present invention as constructed above, the sensor holder is formed into a rail shape, and the fastening mechanism is disposed at the position shifted from the sensor holder. Therefore, it is possible to easily perform the adjustment of the attachment position of the sensor relative to the cylinder tube and to reduce the size of the sensor fixture.

In the aforementioned sensor fixture, the band portion has a first end portion being the band end portion, and a second end portion being another end portion of the band portion, the connection hole is a first connection hole, the protrusion is a first protrusion, the second sidewall includes a second connection hole configured to receive the second end portion, and the second end portion includes a second protrusion configured to be engaged with an inside surface of the second sidewall.

In the aforementioned sensor fixture, in the state that the sensor is attached to the sensor holder, the second end portion may interfere with the sensor, so that the second end portion is prevented from coming off the sensor holder.

With the aforementioned structure, unless the sensor is removed from the sensor holder, the second end portion of the band portion does not come off the sensor holder. Therefore, even when the fastening mechanism is loosened unintentionally, the sensor can be prevented from falling out due to the coming-off of the band portion.

In the aforementioned sensor fixture, an upper end of the second sidewall may have an overhang portion protruding inward, the second connection hole may be in the form of a recessed cutout portion opening upward, the overhang portion may be divided by the cutout portion in a longitudinal direction of the sensor holder, and the second protrusion may have a pair of engaging protrusions protruding toward both sides in a width direction of the band portion.

In the case of the aforementioned structure, in order to remove the second end portion of the band portion from the second connection hole of the sensor holder, it is necessary to lift up the second end portion while pushing the second end portion toward the sensor side. In the state that the sensor is attached to the sensor holder, the sensor becomes an obstacle to the movement of the second end portion, and thus the second end portion is unable to be moved as above. Therefore, the second end portion of the band portion can reliably be prevented from coming off the sensor holder.

In the aforementioned sensor fixture, the second end portion may have a hook portion provided with a fitting groove configured to allow the second sidewall to be inserted and fitted thereinto, and one of mutually facing wall portions of the fitting groove may form the second protrusion.

With this structure, in attaching the sensor fixture to the cylinder tube, it is possible for the band portion to temporarily hold the sensor holder by hooking the hook portion on the second sidewall of the sensor holder (i.e., by fitting the second sidewall into the fitting groove of the hook portion). Therefore, during a work for winding the band portion around the cylinder tube, it is possible to temporarily prevent the sensor holder from falling out from the band portion. Accordingly, it is possible to easily attach the sensor fixture to the cylinder tube.

In the aforementioned sensor fixture, the hook portion may be formed into a U-shape, and an inside surface of the hook portion may define the fitting groove.

With this structure, it is possible to easily form the fitting groove.

In the aforementioned sensor fixture, at least one of the wall portions may be provided with a protrusion protruding toward an inside of the fitting groove.

By providing such a protrusion, the contact area between the hook portion and the second sidewall becomes smaller, and hence, it is possible to hook the hook portion on the second sidewall by a relatively small force.

In the aforementioned sensor fixture, the outer peripheral shape of the cylinder tube may be substantially quadrangular, the band portion may have a positioning portion which is formed into a curved shape along an outer peripheral corner portion of the cylinder tube, and the positioning portion may extend from the hook portion.

With this structure, in attaching the sensor fixture to the cylinder tube, the positioning portion abuts against the outer peripheral corner portion of the cylinder tube to thereby position the sensor holder on the cylinder tube. Therefore, it is possible to easily perform a subsequent fastening work with the fastening mechanism.

In the aforementioned sensor fixture, the outer peripheral shape of the cylinder tube may be substantially quadrangular, and the second connection hole may be provided at an upper portion of the second sidewall.

With this structure, a portion of the band portion that extends between the corner portion of the cylinder tube and the sensor holder is slanted with respect to a surface of the peripheral surface of the cylinder tube to which the sensor holder is fixed. Accordingly, by fastening the band portion, the sensor holder is pressed against the cylinder tube, and hence it is possible to firmly fix the sensor holder to the cylinder tube having a rectangular shape.

In the aforementioned sensor fixture, another band end portion of the band portion may be joined to the sensor holder on a side opposite to a side where the first sidewall is located in the sensor holder.

In the aforementioned sensor fixture, the sensor holder may have a protruding piece protruding laterally from a holder main body having the first sidewall and the second sidewall, and the other band end portion may be joined to the protruding piece.

In the aforementioned sensor fixture, the outer peripheral shape of the cylinder tube may be substantially quadrangular, the sensor holder may be equipped with a bottom wall connecting lower ends of the first sidewall and the second sidewall, and the protruding piece may have a slant portion slanted relative to the bottom wall and may be configured to abut against an outer peripheral corner portion of the cylinder tube.

In the aforementioned sensor fixture, the sensor holder may be provided with a bottom wall connecting lower ends of the first sidewall and the second sidewall, and a flange portion protruding laterally from a side of the bottom wall where the first sidewall is located, the first protrusion may have a pair of engaging protrusions protruding outward in the width direction of the band portion, the first connection hole may have an insertion hole having an opening width configured to allow a portion of the first end portion that is provided with the first protrusion to be inserted thereinto, and an engaging hole provided at a position spaced farther from the bottom wall than the insertion hole and having an opening width narrower than the width of the portion of the first end portion that is provided with the first protrusion, and the fastening mechanism may have a female screw portion formed in the first end portion, and a fastening screw configured to be screw-engaged with the female screw portion and abut against the flange portion.

With this structure, when the fastening screw is tightened in a state that the first end portion of the band portion is inserted into the insertion hole of the first connection hole of the sensor holder and the second end portion of the band portion is hooked on the second sidewall of the sensor holder through the second connection hole, the first end portion is moved toward the engaging hole side, so that tension is applied to the band portion. Accordingly, establishing of the connection between the second end portion and the sensor holder, and applying of tension to the band portion can be carried out simultaneously, and hence it is possible to efficiently attach the sensor fixture to the cylinder tube.

In the aforementioned sensor fixture, the sensor holder may be provided with a bottom wall connecting lower ends of the first sidewall and the second sidewall and a flange portion protruding laterally from a side of the bottom wall where the first sidewall is located, the protrusion may have a pair of engaging protrusions protruding outward in a width direction of the band portion, the connection hole may have an insertion hole having an opening width configured to allow a portion of the band end portion that is provided with the protrusion to be inserted thereinto, and an engaging hole provided at a position spaced farther from the bottom wall than the insertion hole and having an opening width narrower than the width of the portion of the band end portion that is provided with the protrusion, and the fastening mechanism may have a female screw portion formed in the band end portion, and a fastening screw configured to be screw-engaged with the female screw portion and abut against the flange portion.

In the aforementioned sensor fixture, the band end portion may have a nut member having the female screw portion formed therein, and the nut member may be provided with the pair of engaging protrusions.

With this structure, the female screw portion and the pair of engaging protrusions can be provided on a common component, and hence it is possible to reduce the number of components.

In the aforementioned sensor fixture, the fastening mechanism may have a nut member provided at the band end portion and having a female screw portion formed therein, and a fastening screw configured to be screw-engaged with the female screw portion, the nut member may have a plate-shaped base portion having the female screw portion formed therein, the protrusion provided at one end portion of the plate-shaped base portion, and an extending portion extending from the other end portion of the plate-shaped base portion, the band portion may have a belt-shaped band main body having flexibility, and one end portion of the band main body may be fixed to the extending portion.

In the aforementioned sensor fixture, the band portion may have a belt-shaped band main body having flexibility, and the fastening mechanism may have a nut member provided between one end portion and the other end portion of the band main body and having a female screw portion formed therein, and a fastening screw configured to be screw-engaged with the female screw portion and abut against a corner portion of the cylinder tube having a rectangular shape in cross-section.

In the aforementioned sensor fixture, the fastening mechanism may have a first fastening mechanism and a second fastening mechanism, the first fastening mechanism may have a first nut member provided at the band end portion and having a first female screw portion formed therein, and a first fastening screw configured to be screw-engaged with the first female screw portion, and the second fastening mechanism may have a second nut member provided between one end portion and the other end portion of the band main body and having a second female screw portion formed therein, and a second fastening screw configured to be screw-engaged with the second female screw portion and abut against a corner portion of the cylinder tube having a rectangular shape in cross-section.

In the aforementioned sensor fixture, the band portion may have a belt-shaped band main body having flexibility, and a stopper protruding from an inside surface of the band main body and configured to abut against an outer peripheral surface of the cylinder tube.

In the aforementioned sensor fixture, the band portion may have a belt-shaped band main body having flexibility, the sensor holder may be provided with a bottom wall connecting lower ends of the first sidewall and the second sidewall, and a flange portion protruding laterally from a side of the bottom wall where the first sidewall is located, the flange portion being slanted relative to the bottom wall, the fastening mechanism may have a nut member provided at one end portion of the band main body and having a female screw portion formed therein, and a fastening screw configured to be screw-engaged with the female screw portion, and in a state that the nut member is engaged with the first sidewall, that the fastening screw is screw-engaged with the nut member, and that the fastening screw abuts against the flange portion, a portion of the band main body that is located between a portion thereof provided with the nut member and a portion thereof wound around an outer peripheral surface of the cylinder tube may be slanted relative to a line parallel to an axis of the fastening screw.

According to the sensor fixture of the present invention, it is possible to easily adjust the attachment position of the sensor with respect to the cylinder tube and to make the structure compact.

BRIEF DESCRIPTION OF DRAWINGS

FIG. 8A is a side view of a hook member, and FIG. 8B is a perspective view of the hook member;

FIG. 9A is an enlarged view of main components of a sensor fixture according to a third embodiment of the present invention, and FIG. 9B is an explanatory view of the sensor fixture applied to a fluid pressure cylinder having a relatively small diameter;

FIG. 11A is an explanatory view of a sensor fixture according to a fifth embodiment of the present invention, and FIG. 11B is an explanatory view of a band portion as viewed in the arrow B direction in FIG. 11A;

FIG. 21 is an enlarged view of main components of the sensor fixture shown in FIG. 20.

DESCRIPTION OF EMBODIMENTS

Hereinafter, a sensor fixture according to the present invention will be described based on preferred embodiments with reference to the accompanying drawings.

Figure 1:
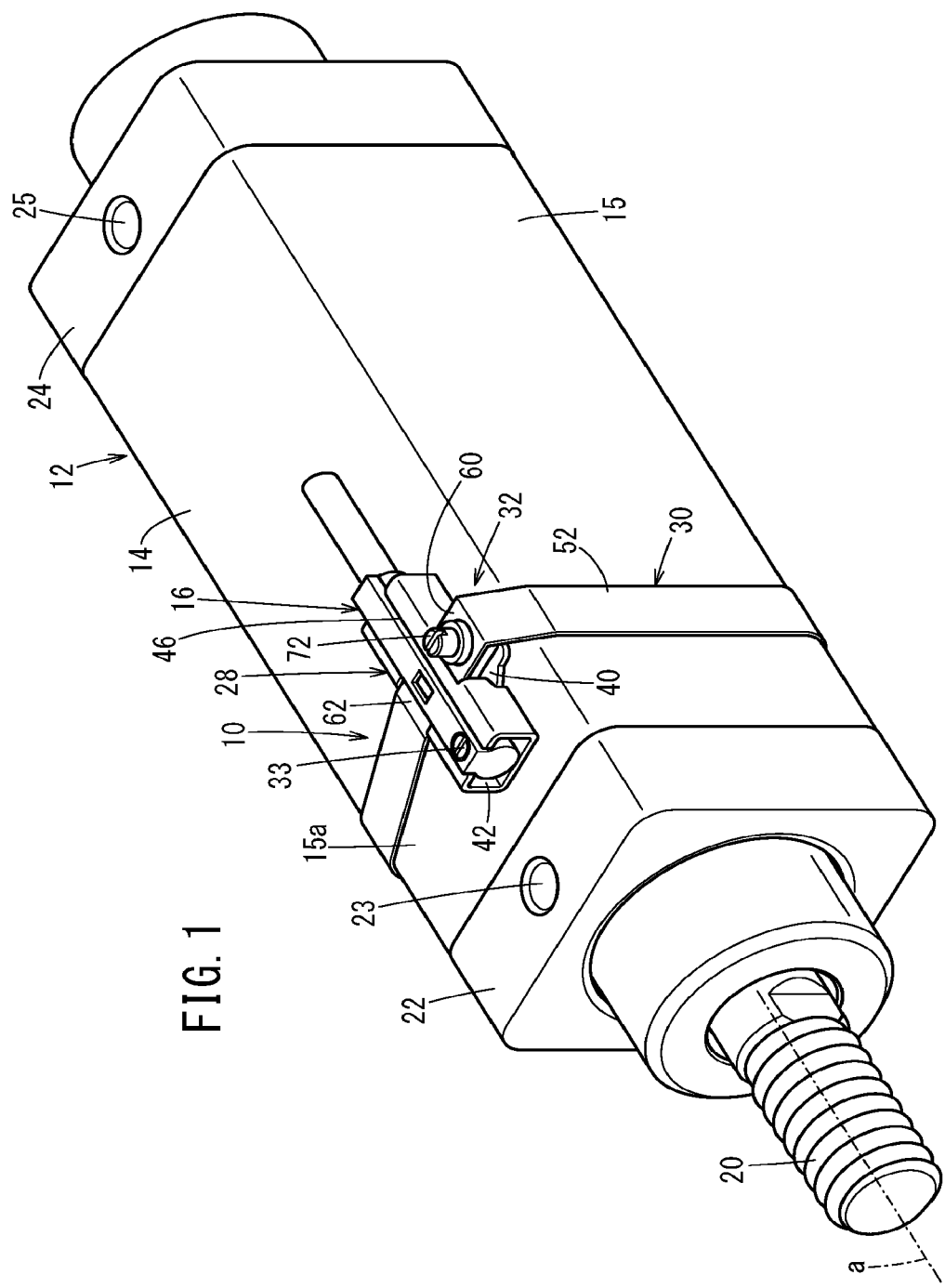
FIG. 1 is a perspective view of a fluid pressure cylinder with a sensor fixture according to a first embodiment of the present invention being attached thereto.

As shown in FIG. 1, a sensor fixture 10 according to a first embodiment of the present invention is attached to an outer peripheral surface 15 of a cylinder tube 14 of a fluid pressure cylinder 12 (air cylinder, for example) and is used for attaching a position sensor 16 to the outer peripheral surface 15.

The fluid pressure cylinder 12 is equipped with the cylinder tube 14 containing therein a cylinder hole, a piston (not shown) housed in the cylinder tube 14 so as to be slidable along its central axis a, and a piston rod 20 connected to the piston and protruding outside the cylinder tube. The outer peripheral shape (the profile shape in a cross section perpendicular to the central axis a) of the cylinder tube 14 in the illustrated example is a substantially square shape with four corners each formed in an arc shape.

Pressure fluid (compressed air, for example) is alternately supplied to and discharged from pressure chambers on opposite sides of the aforementioned piston through a port 23 of a rod cover 22 provided at one end of the cylinder tube 14 and a port 25 formed in a head portion 24 provided at the other end, so that the piston is advanced or retracted. A ring-shaped permanent magnet is mounted on an outer periphery of the piston, and the position sensor 16 is configured to detect the magnetism of the permanent magnet and output a detection signal of an operating position of the piston.

Figure 2:
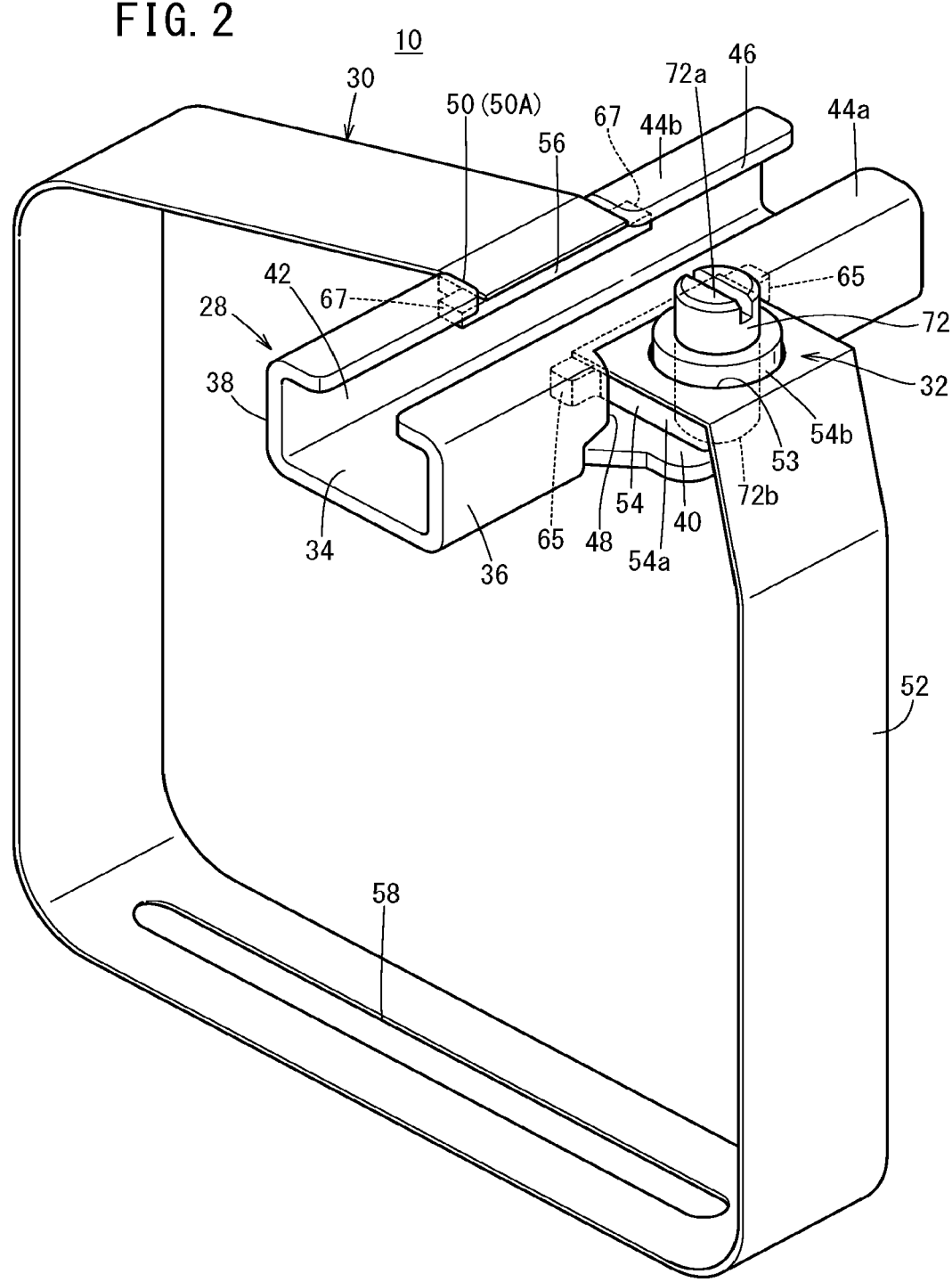
FIG. 2 is a perspective view of the sensor fixture shown in FIG. 1.

As shown in FIG. 1 and FIG. 2, the sensor fixture 10 is equipped with a rail-shaped sensor holder 28 for holding the position sensor 16, a band portion 30 having a first end portion 60 and a second end portion 62 connectable to the sensor holder 28 and wound around the outer peripheral surface 15 of the cylinder tube 14, and a fastening mechanism 32 for fastening the band portion 30.

In FIG. 1, the sensor holder 28 is disposed with its longitudinal direction alongside the axial direction of the fluid pressure cylinder 12. The position sensor 16 is configured to be inserted into and fixed to the sensor holder 28. To this end, a set screw 33 is screw-engaged with the position sensor 16. When the set screw 33 is tightened, the position sensor 16 is fixed to the sensor holder 28. Contrarily, when the set screw 33 is loosened, the position sensor 16 is enabled to move along a sensor insertion groove 42, and thus, it is possible to finely adjust the position of the position sensor 16 in the axial direction (in a stroke direction) of the fluid pressure cylinder 12.

Figure 3:
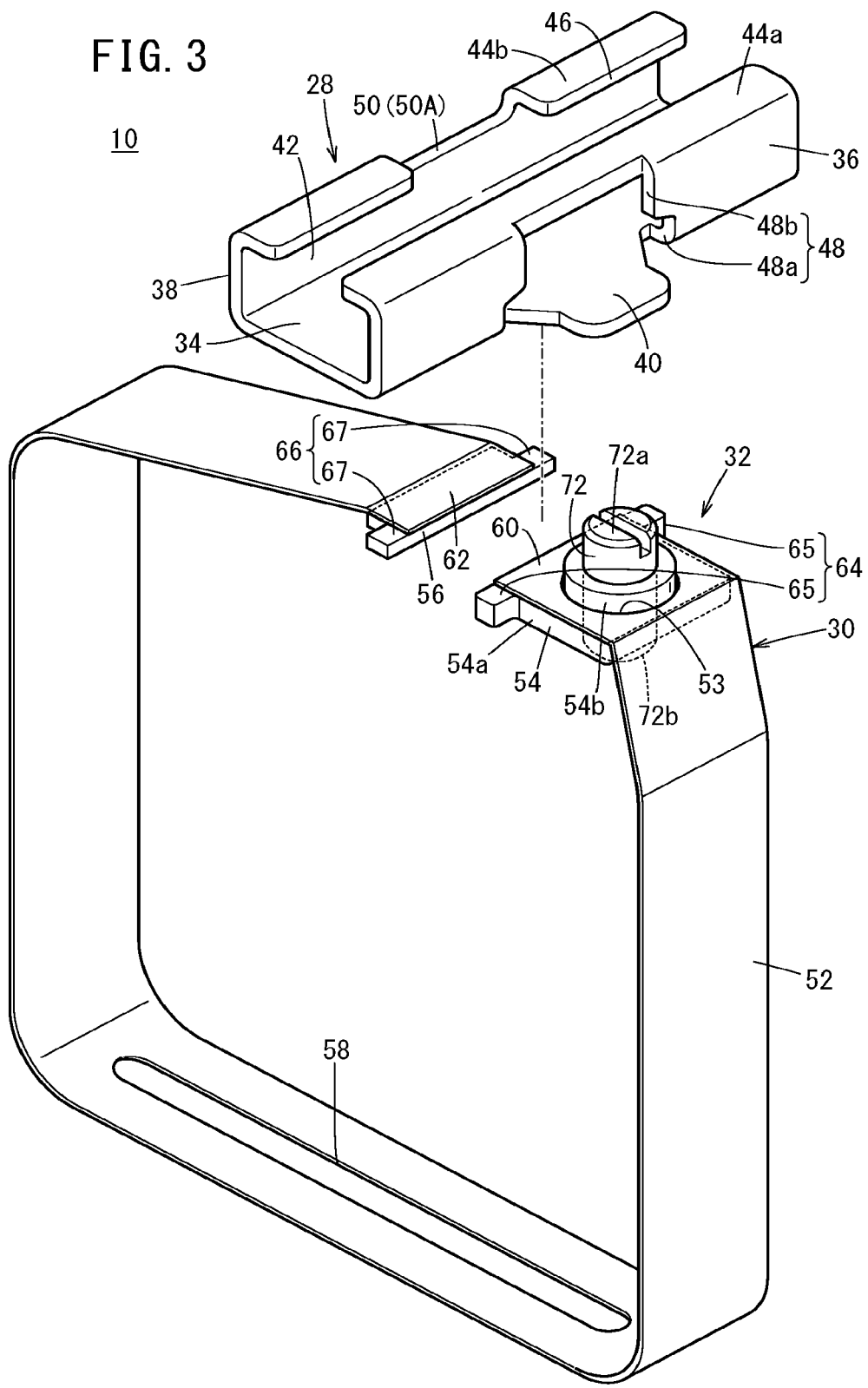
FIG. 3 is an exploded perspective view of the sensor fixture shown in FIG. 1.

As shown in FIG. 2 and FIG. 3, the sensor holder 28 has a bottom wall 34 taking a rectangular shape, a first sidewall 36 extending upward from one long side of the bottom wall 34, a second sidewall 38 extending upward from the other long side of the bottom wall 34, and a flange portion 40 protruding laterally from one side of the bottom wall 34 that is provided with the first sidewall 36.

The first sidewall 36 and the second sidewall 38 extend in the longitudinal direction of the sensor holder 28 and face each other in parallel to each other. The sensor insertion groove 42 for accommodating and holding the position sensor 16 in a position-adjustable manner is defined by the bottom wall 34, the first sidewall 36 and the second sidewall 38 in the longitudinal direction of the sensor holder 28.

An upper end of the first sidewall 36 and an upper end of the second sidewall 38 (end edges on a side opposite the bottom wall 34) are respectively provided with overhang portions 44a, 44b protruding inward in the width direction of the sensor holder 28. The overhang portion 44a protruding from the first sidewall 36 and the overhang portion 44b protruding from the second sidewall 38 define therebetween an opening 46 extending in the longitudinal direction of the sensor holder 28. As shown in FIG. 1, in a state where the position sensor 16 is inserted into the sensor holder 28, an upper portion of the position sensor 16 is exposed through the opening 46.

As shown in FIG. 3, the first sidewall 36 is provided with a first connection hole 48 (connection hole) capable of receiving the first end portion 60 of the band portion 30. The first connection hole 48 is an opening having a reverse T-shape penetrating through the first sidewall 36 in the thickness direction thereof and, in the illustrated example, is provided at a substantially central portion of the sensor holder 28 in the longitudinal direction. Specifically, the first connection hole 48 has an insertion hole 48a having a relatively large opening width (i.e., dimension in the longitudinal direction of the sensor holder 28) and an engaging hole 48b having a relatively small opening width. The insertion hole 48a is formed on a lower side of the first sidewall 36, and has an opening width and an opening height that enable the first end portion 60 (including a pair of engaging protrusions 65 to be described later) of the band portion 30 to be inserted therethrough from the lateral side.

The engaging hole 48b is formed on the upper side of the first sidewall 36 so as to connect with an upper portion of the insertion hole 48a. The opening width of the engaging hole 48b is the same as or greater than the width of the first end portion 60 excluding the pair of engaging protrusions 65 to be described later, and is smaller than the width of the first end portion 60. Further, the opening height of the engaging hole 48b is larger than the thickness of the first end portion 60. Of the first sidewall 36, upper ends of wall elements constituting both sides of the first connection hole 48 are connected through the overhang portion 44a.

The second sidewall 38 is provided with a second connection hole 50 capable of receiving the second end portion 62 of the band portion 30. The second connection hole 50 takes the form of a recessed cutout portion 50A opening upward and, in the illustrated example, is provided at a substantially central portion of the sensor holder 28 in the longitudinal direction. The overhang portion 44b provided at the upper end of the second sidewall 38 is divided by the cutout portion 50A in the longitudinal direction of the sensor holder 28.

The flange portion 40 is provided at a position corresponding to the first connection hole 48 in the longitudinal direction of the sensor holder 28. That is, the flange portion 40 extends from the bottom wall 34 at the lower position of the first connection hole 48, outward in the width direction of the sensor holder 28. The flange portion 40 in the illustrated example is formed so as to be relatively large in width on a base side connected to the bottom wall 34 and so as to be relatively small in width on a protruding end side. Incidentally, the flange portion 40 may be formed so as to have a constant width from the base side to the protruding end side.

The sensor holder 28 having the aforementioned structure is made of a metal such as, for example, stainless steel or the like, and can be formed by pressing and bending of a metal plate.

The first end portion 60 and the second end portion 62 of the band portion 30 are connectable to the sensor holder 28, and the band portion 30 is configured to be wound around the outer peripheral surface 15 of the cylinder tube 14 in the circumferential direction.

In the present embodiment, the band portion 30 has a band main body 52 extending like a belt and being elastically deformable, a T-shaped nut member 54 overlapped with and joined to one end portion of the band main body 52, and a T-shaped reinforcing plate 56 overlapped with and joined to the other end portion of the band main body 52. For example, the band main body 52 has a plurality of straight portions and a plurality of curved portions so as to correspond to the outer peripheral shape (quadrilateral shape) of the cylinder tube 14. The band main body 52 having such a shape can be formed by bending and plastic deformation of a belt-shaped thin metal plate.

In the present embodiment, the band main body 52 is provided with a slit 58 penetrating therethrough in the thickness direction of the band main body 52 and extending in the extending direction of the band main body 52. Particularly, in the case of the illustrated example, the slit 58 is formed in a straight portion of the band main body 52 that faces the sensor holder 28. By provision of such a slit 58, an improvement is made in close contact of the band main body 52 with the outer peripheral surface 15 of the cylinder tube 14, and thus, it is possible to restrain slippage of the sensor fixture 10 with respect to the cylinder tube 14 and looseness of the band portion 30 caused by shaking. Incidentally, the slit 58 may not be provided.

The nut member 54, together with the one end portion of the band main body 52, makes up the first end portion 60 which is one band end portion connected to the first sidewall 36 of the sensor holder 28. The nut member 54 of the first end portion 60 is provided with a first protrusion 64 (protrusion) configured to be connectable through engagement with first connection hole 48 of the sensor holder 28. Specifically, the first protrusion 64 has a pair of engaging protrusions 65 protruding toward both sides in the width direction of the band portion 30.

Further, the nut member 54 in the illustrated example is provided with a plate-shaped base portion 54a overlapped with and fixed to one end portion of the band main body 52 and a tubular portion 54b protruding from the plate-shaped base portion 54a. The plate-shaped base portion 54a is provided with the aforementioned pair of engaging protrusions 65. The tubular portion 54b passes through a through hole 53 formed at one end portion of the band main body 52 and protrudes upward from the through hole 53.

Figure 4:
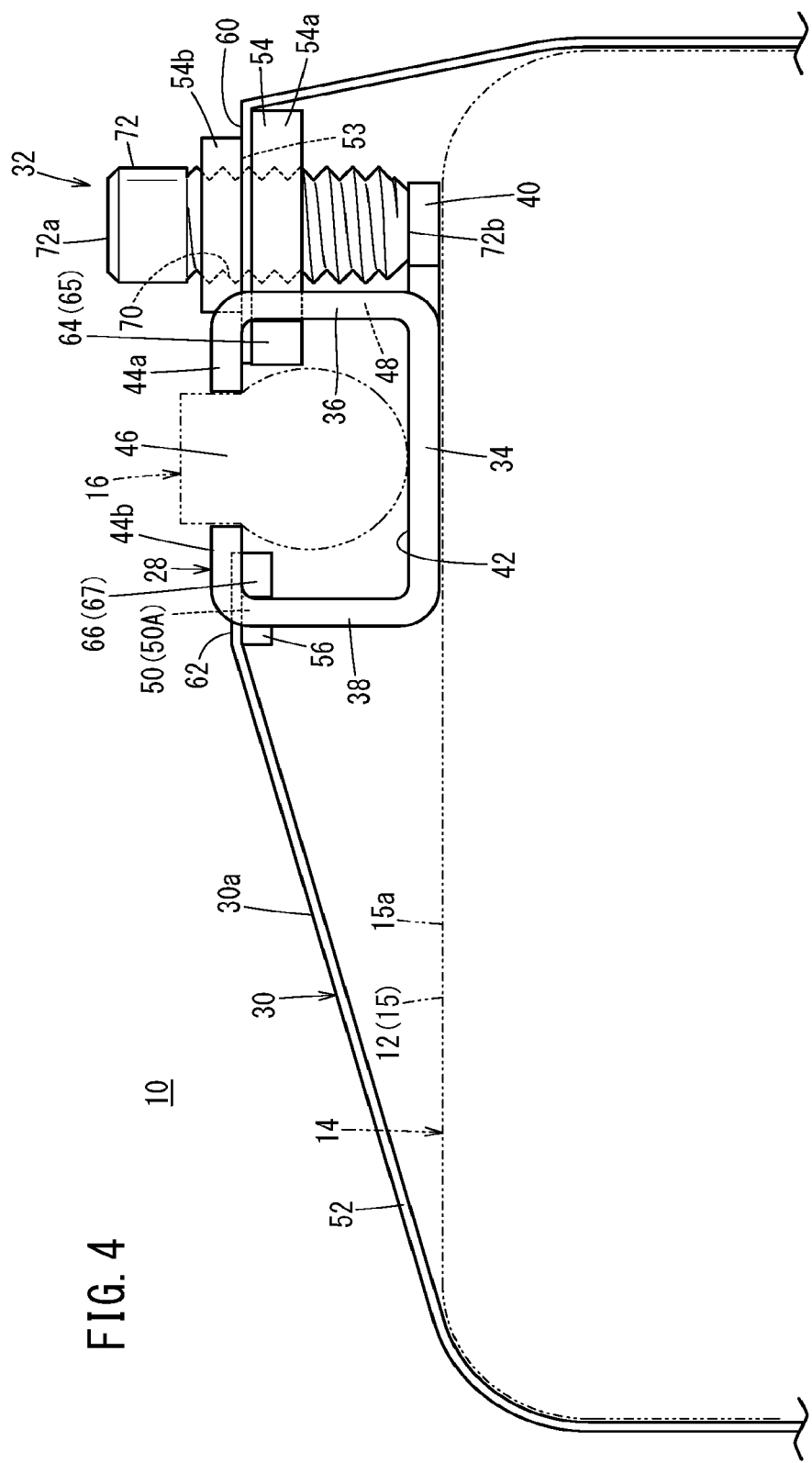
FIG. 4 is an enlarged view of main components of the sensor fixture shown in FIG. 1.

When the first protrusion 64 is inserted into the insertion hole 48a of the first connection hole 48 from outside in the width direction of the sensor holder 28 and the nut member 54 is moved into the engaging hole 48b, the first end portion 60 of the band portion 30 is connected to the sensor holder 28 (first sidewall 36). As shown in FIG. 4, in the state that the first end portion 60 is connected to the sensor holder 28, the end edge of the first end portion 60 protrudes inside the sensor holder 28 through the first connection hole 48, and the pair of engaging protrusions 65 are engaged with the inside surface of the first sidewall 36 (more specifically, portions of the insider surface of the first sidewall 36 that are located on both sides of the engaging hole 48b).

In FIG. 2 and FIG. 3, the reinforcing plate 56, together with the other end portion of the band main body 52, makes up the second end portion 62 which is another band end portion connected to the second sidewall 38 of the sensor holder 28. The reinforcing plate 56 of the second end portion 62 is provided with a second protrusion 66 configured to be engageable with the second connection hole 50 (cutout portion 50A) of the sensor holder 28. Specifically, the second protrusion 66 has a pair of engaging protrusions 67 protruding toward both sides in the width direction of the band portion 30.

When the second end portion 62 is inserted into the cutout portion 50A through the opening 46 from above the sensor holder 28, the second end portion 62 of the band portion 30 is connected to the sensor holder 28. As shown in FIG. 4, in the state that the second end portion 62 is connected to the sensor holder 28, the end edge of the second end portion 62 protrudes inside the sensor holder 28 (into the sensor insertion groove 42) through the cutout portion 50A and the pair of engaging protrusions 67 are engaged with the inside surface of the second sidewall 38 (more specifically, portions of the inside surface of the second sidewall 38 that are located on both sides of the cutout portion 50A).

As shown in FIG. 1, on the outer peripheral surface 15 of the cylinder tube 14, the fastening mechanism 32 is disposed at a position shifted from the sensor holder 28 in the circumferential direction. Specifically, in the present embodiment, the fastening mechanism 32 is provided at the first end portion 60 of the band portion 30 and is disposed adjacent to a lateral side of the sensor holder 28.

In FIG. 2 and FIG. 3, the fastening mechanism 32 has the nut member 54 secured to the band main body 52 and having a female screw 70 formed therein (refer to FIG. 4), and a fastening screw 72 screw-engaged with the female screw 70 and which abuts against the flange portion 40. That is, in the present embodiment, the nut member 54 is a component of the band portion 30 and is also a component of the fastening mechanism 32.

In order to rotate the fastening screw 72 by using a tool such as a screw driver, a hex wrench or the like, a head portion 72a of the fastening screw 72 is provided with a tool insertion groove having a noncircular shape (straight, cross, hexagon or the like). An end portion 72b of the fastening screw 72 is able to protrude from a lower surface of the nut member 54 toward the inside of the band portion 30. When the fastening screw 72 is turned in a tightening direction, the protruding length of the fastening screw from the lower surface of the nut member 54 increases. Reversely, when the fastening screw 72 is turned in a loosening direction, the protruding length thereof from the lower surface of the nut member 54 decreases.

Next, description will be made regarding the operation and effects of the sensor fixture 10 constructed as described above.

In order to mount the position sensor 16 on the outer peripheral surface 15 of the cylinder tube 14 by use of the sensor fixture 10, first of all, the sensor fixture 10 without the position sensor 16 being inserted into the sensor holder 28 is loosely disposed along the outer peripheral surface 15 of the cylinder tube 14.

Specifically, the first end portion 60 (the first protrusion 64) of the band portion 30 is connected to the first sidewall 36 (the first connection hole 48) of the sensor holder 28, the second end portion 62 (the second protrusion 66) of the band portion 30 is connected to the second sidewall 38 (the second connection hole 50) of the sensor holder 28, and the band portion 30 is wound along the outer peripheral surface 15 of the cylinder tube 14. In this case, the fastening screw 72 is tightened slightly after the first protrusion 64 has been inserted into the insertion hole 48a of the first connection hole 48, so that the end portion 72b of the fastening screw 72 is protruded slightly from the lower surface of the nut member 54 to thereby abut against the flange portion 40. Thus, the first end portion 60 is inserted shallowly into the engaging hole 48b, whereby the first end portion 60 is prevented from dropping out of the first connection hole 48. In this state, the bottom wall 34 is held in contact with one flat outer surface 15a (refer to FIG. 4) of the outer peripheral surface 15 of the cylinder tube 14, and the flange portion 40 is supported on this outer surface 15a.

Subsequently, the position sensor 16 is inserted into the sensor holder 28, and the set screw 33 (refer to FIG. 1) is tightened to fix the position sensor 16 to the sensor holder 28.

Next, the fastening screw 72 of the fastening mechanism 32 is tightened strongly. Then, as the end portion 72b of the fastening screw 72 abutting against the flange portion 40 protrudes further from the nut member 54, the distance between the nut member 54 and the flange portion 40 becomes larger (the nut member 54 is moved upward along the first sidewall 36). As a result, tension is applied to the band portion 30, that is, the band portion 30 is tightly fastened, whereby the sensor holder 28 is strongly pulled toward the outer peripheral surface 15 of the cylinder tube 14.

Thus, the sensor fixture 10 is fixed to the cylinder tube 14, whereby attaching of the position sensor 16 to the outer peripheral surface 15 of the cylinder tube 14 is completed. In this case, because the sensor holder 28 and the fastening mechanism 32 are arranged at different positions displaced from each other in the circumferential direction, bulging portions from the outer peripheral surface 15 of the cylinder tube 14 can be made to be smaller.

Incidentally, the foregoing attaching procedure may be changed, so that the position sensor 16 may be fixed to the sensor holder 28 after the fastening screw 72 of the fastening mechanism 32 has been tightened strongly to thereby fix the sensor fixture 10 to the cylinder tube 14.

When the position of the position sensor 16 needs to be adjusted relative to the cylinder tube 14, the set screw 33 is loosened, and the position sensor 16 is slid in the longitudinal direction of the sensor holder 28 (in the axial direction of the fluid pressure cylinder 12) and moved to a desired position. Thereafter, the set screw 33 is tightened to thereby fix the position sensor 16.

As described above, according to the sensor fixture 10, because the sensor holder 28 is formed in a rail shape and the fastening mechanism 32 is located at a position shifted from the sensor holder 28 in the circumferential direction, it is possible to easily adjust the attachment position of the position sensor 16 with respect to the cylinder tube 14 and to achieve a compact structure.

In the present embodiment, in order to remove the second end portion 62 of the band portion 30 from the second sidewall 38 of the sensor holder 28 in the state that the second end portion 62 is engaged with the second sidewall 38, it is necessary to push the second end portion 62 toward the inside of the sensor holder 28 and at the same time, move the second end portion 62 upward (toward the opening 46 side). However, even when an attempt is made to push the second end portion 62 as above with the position sensor 16 attached to the sensor holder 28, the second end portion 62 interferes with the position sensor 16, and hence, it is impossible to move the second end portion 62 toward the inside of the sensor holder 28 (toward the position sensor 16 side).

That is, even when trying to push the second end portion 62 with the position sensor 16 being attached to the sensor holder 28, an edge portion of the second end portion 62 is brought into abutment against the position sensor 16, so that it is impossible for the second end portion 62 to move to a position where the second end portion 62 can be released from engagement with the second sidewall 38. For this reason, in the state that the position sensor 16 is attached to the sensor holder 28, the second end portion 62 is prevented from being disengaged from the sensor holder 28, due to the interference with the position sensor 16.

In short, unless the position sensor 16 is removed from the sensor holder 28, cases do not occur that the second end portion 62 comes off the sensor holder 28. Accordingly, even when the fastening screw 72 of the fastening mechanism 32 is loosened somewhat unintentionally, it is possible to avoid such a situation that the band portion 30 comes away and then the position sensor 16 falls off the cylinder tube 14.

In the present embodiment, the sensor holder 28 has the flange portion 40 protruding laterally from the bottom wall 34, the first protrusion 64 has the pair of engaging protrusions 65, and the first connection hole 48 is formed in a reverse T-shape comprising the insertion hole 48a and the engaging hole 48b. With this construction, when the fastening screw 72 is tightened in the state that the first end portion 60 of the band portion 30 is inserted into the insertion hole 48a of the first connection hole 48 of the sensor holder 28 and that the second end portion 62 of the band portion 30 is hooked on the second sidewall 38 of the sensor holder 28 through the second connection hole 50 (the cutout portion 50A), the first end portion 60 is moved toward the engaging hole 48b (i.e., upward), and then tension is applied to the band portion 30. Accordingly, it is possible to simultaneously perform two tasks, i.e., establishing the connection between the second end portion 62 and the sensor holder 28, and applying tension to the band portion 30, and hence, it is possible to efficiently carry out attaching of the sensor fixture 10 to the cylinder tube 14.

Further, in the present embodiment, the first end portion 60 of the band portion 30 has the nut member 54 having the female screw 70 formed therein, and the nut member 54 is provided with the pair of engaging protrusions 65. With this structure, it is possible to provide the female screw 70 and the pair of engaging protrusions 65 on a common component, and thus, it is possible to reduce the number of components.

Further, since the second connection hole 50 is provided at the upper portion of the second sidewall 38 of the sensor holder 28, the sensor fixture 10 according to the present embodiment is suitably applicable to the cylinder tube 14 having a so-called square or rectangular shape whose outer peripheral shape is substantially quadrangular. That is, since the second connection hole 50 is provided at the upper portion of the second sidewall 38, a portion 30a (refer to FIG. 4) of the band portion 30 extending between a corner of the cylinder tube 14 and the sensor holder 28 is slanted with respect to an outer surface 15a to which the sensor holder 28 is fixed, of the outer peripheral surface 15 of the cylinder tube 14. Accordingly, the band portion 30 in the fastened state presses the sensor holder 28 against the cylinder tube 14, and thus it is possible to firmly fix the sensor holder 28 to the square shaped cylinder tube 14.

Figure 5:
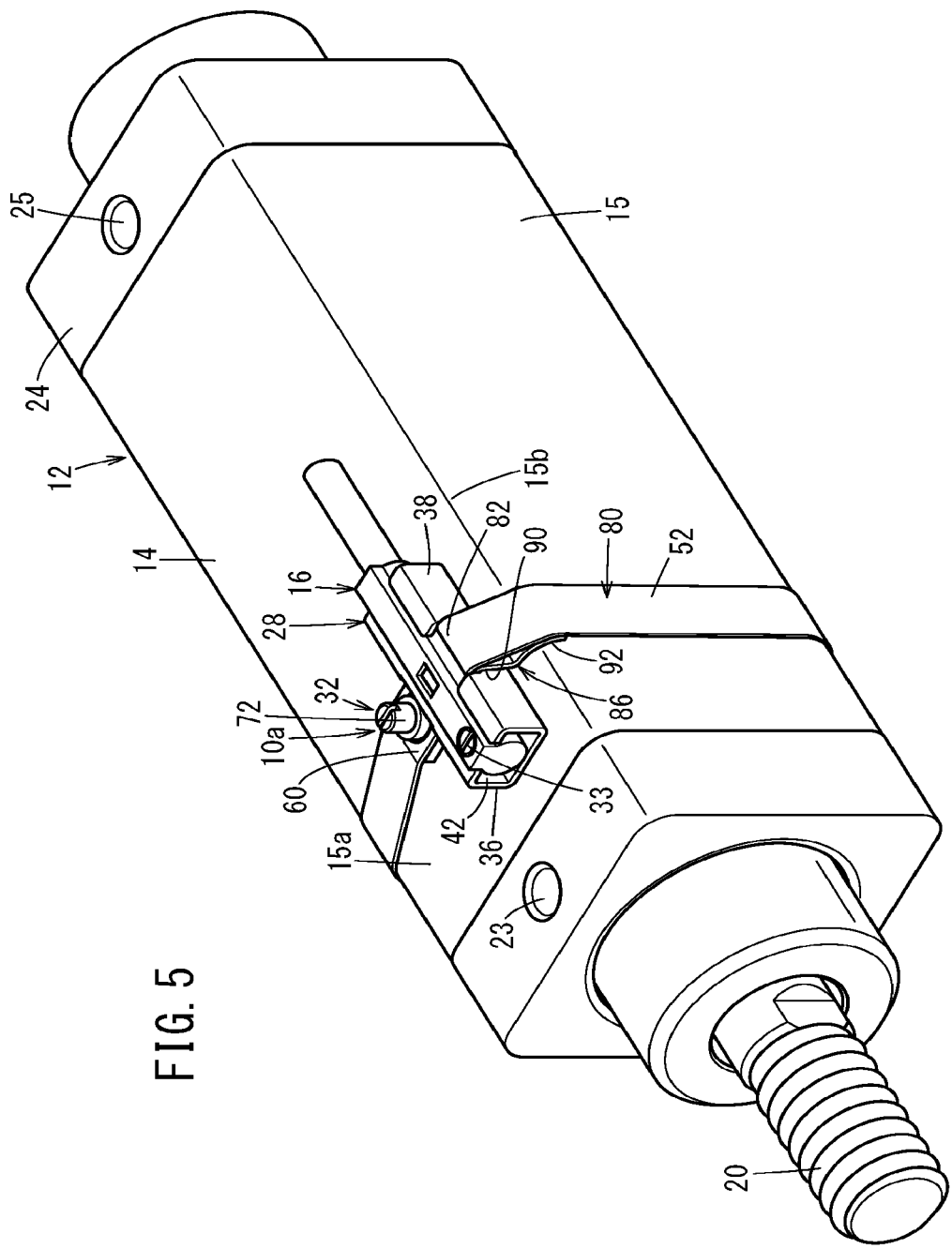
FIG. 5 is a perspective view of a fluid pressure cylinder with a sensor fixture according to a second embodiment of the present invention being attached thereto.

In FIG. 5, a sensor fixture 10a according to the second embodiment is attached to an outer peripheral surface 15 of a cylinder tube 14 of a fluid pressure cylinder 12. This sensor fixture 10a is equipped with a sensor holder 28, a band portion 80, and a fastening mechanism 32. The sensor fixture 10a differs from the sensor fixture 10 according to the foregoing first embodiment in the structure of the band portion 80. The sensor holder 28 and the fastening mechanism 32 of the sensor fixture 10a are the same as the sensor holder 28 and the fastening mechanism 32 of the sensor fixture 10 according to the first embodiment.

The band portion 80 has a first end portion 60 and a second end portion 82 that are connectable to the sensor holder 28, and is configured to be wound around the outer peripheral surface 15 of the cylinder tube 14. The first end portion 60 of the band portion 80 has the same structure as the first end portion 60 of the band portion 30 in the first embodiment. Accordingly, the first end portion 60 is one end portion of the band portion 80, and is configured to be connectable to a first sidewall 36 of the sensor holder 28.

Figure 6:
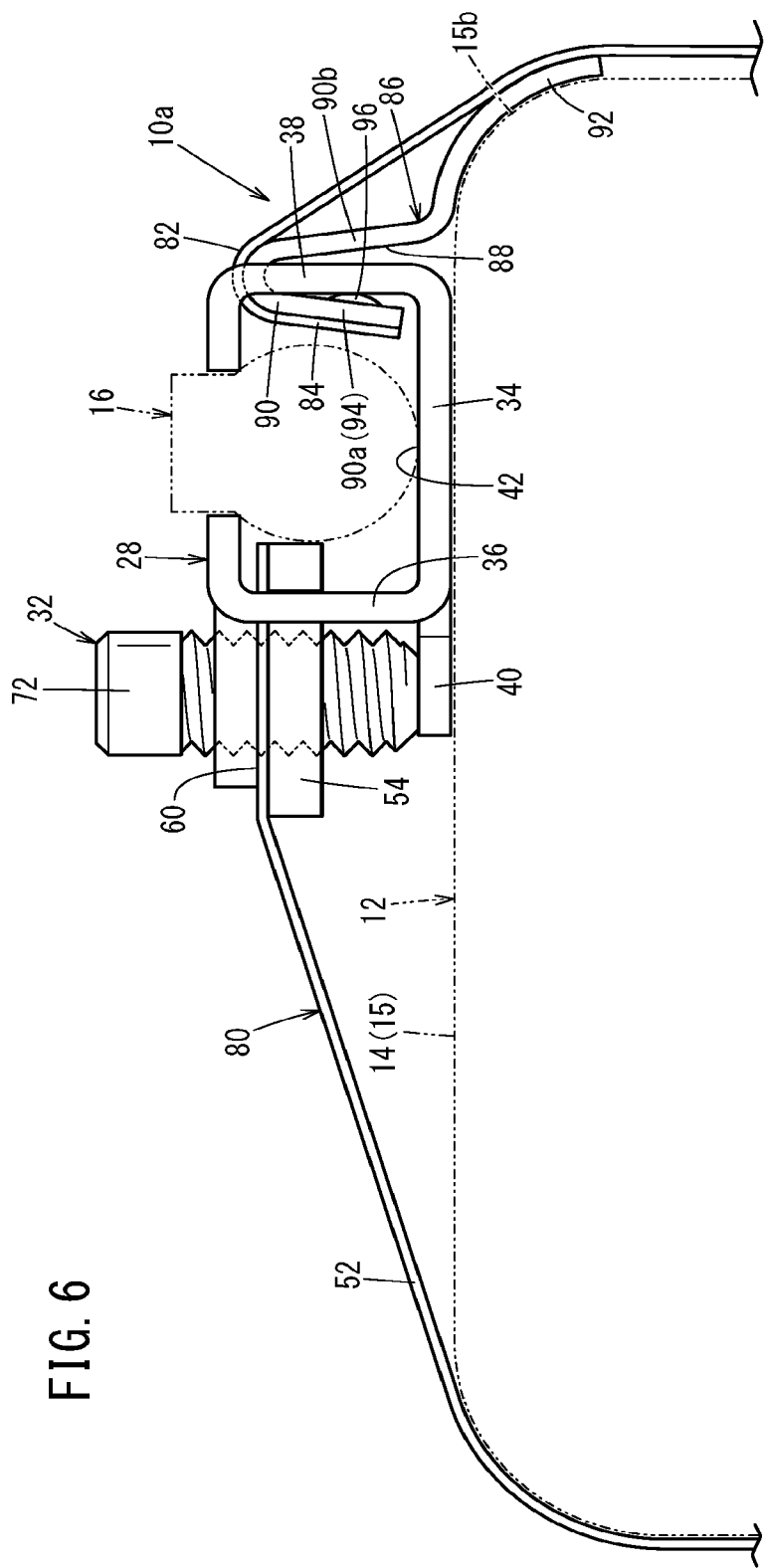
FIG. 6 is an enlarged view of main components of the sensor fixture shown in FIG. 5.
Figure 7:
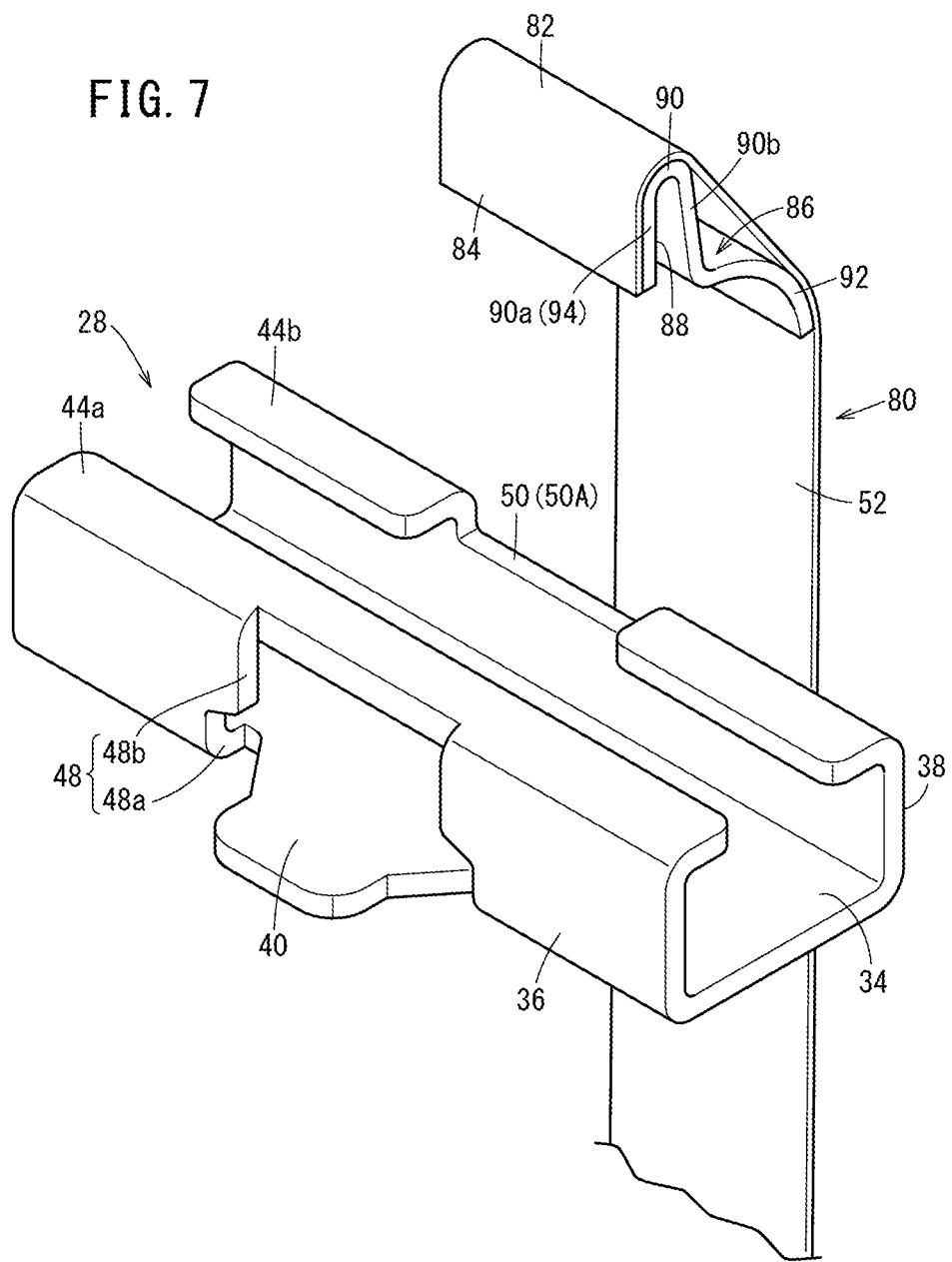
FIG. 7 is a perspective view showing a sensor holder and a band portion (a second end side) of the sensor fixture shown in FIG. 5.

The second end portion 82 of the band portion 80 is the other end portion of the band portion 80, and is configured to be connectable to a second sidewall 38 of the sensor holder 28. As shown in FIG. 6 and FIG. 7, an end portion of a band main body 52 on the second end portion 82 side has a bent portion 84 having a shape obtained by bending the end portion inward in the form of a hook. A hook member 86 is secured inside the bent portion 84. The bent portion 84 and the hook member 86 may be secured, for example, by welding, adhesion, or the like.

The hook member 86 is formed by bending a plate-shaped member which is thicker than the band main body 52. Specifically, the hook member 86 has a hook portion 90 provided with a fitting groove 88 into which the second sidewall 38 of the sensor holder 28 is inserted and fitted, and a positioning portion 92 extending from the hook portion 90. The hook portion 90 is formed in a U-shape. The hook portion 90 is fixed to the bent portion 84 of the band main body 52. The second end portion 82 of the band portion 80 is made up of the other end portion of the band main body 52 and the hook portion 90.

An inside surface of the hook portion 90 defines the fitting groove 88. The hook portion 90 has wall portions 90a, 90b facing each other. In an initial state (i.e., in a state before the second sidewall 38 of the sensor holder 28 is inserted and fitted into the fitting groove 88 of the hook portion 90), the wall portions 90a, 90b face each other substantially in parallel to each other. When the second sidewall 38 of the sensor holder 28 is fitted into the hook portion 90 (the fitting groove 88), the second sidewall 38 is held while being interposed between the wall portions 90a, 90b of the hook portion 90.

One (i.e., the wall portion 90a) of the mutually facing wall portions 90a, 90b of the fitting groove 88 forms a second protrusion 94 configured to be engaged with an inside surface of the second sidewall 38 of the sensor holder 28. As shown in FIG. 8A and FIG. 8B, the inside surface of the wall portion 90*a* is provided with protrusions 96 (small protrusions) protruding toward the inside of the fitting groove 88 (toward the wall portion 90*b* on the other side).

As shown in FIG. 6, the protrusions 96 abut against the second sidewall 38 when the second sidewall 38 of the sensor holder 28 is fitted in the hook portion 90 (the fitting groove 88). A plurality of (two in the illustrated example) the protrusions 96 are arranged at intervals. Incidentally, the protrusions 96 may be provided on an inside surface of the other wall portion 90*b*. The protrusions 96 may be provided on the inside surface of each of the wall portions 90*a*, 90*b*. Depending on conditions (material, rigidity, and the like of the hook portion 90), the protrusions 96 may not be provided.

The positioning portion 92 extends from an end portion (lower end portion) of the wall portion 90*b* of the U-shaped hook portion 90. Specifically, the positioning portion 92 is formed in a curved shape along an outer peripheral corner portion 15*b* of the cylinder tube 14. Because the outer peripheral corner portion 15*b* of the cylinder tube 14 is formed in an arc shape, the positioning portion 92 is also formed in an arc shape. Incidentally, the positioning portion 92 may not be provided.

The sensor fixture 10*a* as constructed above can be attached to the outer peripheral surface 15 of the cylinder tube 14 in accordance with the following works.

Firstly, the second end portion 82 (the second protrusion 94) of the band portion 80 is connected to the second sidewall 38 of the sensor holder 28. Specifically, the second sidewall 38 is inserted into the fitting groove 88 of the hook portion 90 through the cutout portion 50A (refer to FIG. 7) of the sensor holder 28, whereby the second sidewall 38 is fitted into the fitting groove 88. Thus, the second sidewall 38 is held while being interposed between the wall portions 90*a*, 90*b* of the hook portion 90.

In this case, the protrusions 96 are provided on the inside surface of the wall portion 90*a* of the hook portion 90, and on the wall portion 90*a* side, the protrusions 96 only are in contact with the second sidewall 38. Thus, insertion resistance of the second sidewall 38 into the fitting groove 88 is relatively small. Accordingly, it is possible to connect the hook portion 90 to the second sidewall 38 by a relatively small force.

Next, the sensor holder 28 with the second end portion 82 being connected to the band portion 80 is placed on the outer peripheral surface 15 of the cylinder tube 14. At this time, since the positioning portion 92 in the form of a curved shape abuts against the outer peripheral corner portion 15*b* of the cylinder tube 14, the sensor holder 28 is positioned on the cylinder tube 14.

Thereafter, the band portion 80 is wound around the outer peripheral surface 15 of the cylinder tube 14 (winding work). During this winding work, the sensor holder 28 is held by the band portion 80 since the second sidewall 38 is fitted in the hook portion 90. For this reason, during the winding work, the sensor holder 28 is temporarily held so as not to fall off the band portion 80. Accordingly, it is possible to easily perform attachment work of the sensor fixture 10*a* to the cylinder tube 14.

Subsequently, the first end portion 60 (the first protrusion 64) of the band portion 80 is connected to the first sidewall 36 (the first connection hole 48) of the sensor holder 28. Specifically, the fastening screw 72 is tightened (i.e., fastening work) after the first protrusion 64 has been inserted into the insertion hole 48*a* of the first connection hole 48 (refer to FIG. 7). Thus, as shown in FIG. 6, the band portion 80 is fastened, whereby the sensor holder 28 is pulled strongly toward the outer peripheral surface 15 of the cylinder tube 14. As a result, the sensor fixture 10*a* is fixed to the cylinder tube 14.

It is possible to easily perform the fastening work because during the fastening work, the sensor holder 28 is positioned on the cylinder tube 14 by the positioning portion 92. That is, the outer peripheral corner portion 15*b* of the cylinder tube 14 is formed in the arc shape, and the positioning portion 92, which is similarly formed in the arc shape, abuts against the outer peripheral corner portion 15*b*, so that the sensor holder 28 is stably held in place. Accordingly, during the fastening work, the sensor holder 28 is prevented from deviating with respect to the cylinder tube 14.

Once the band portion 80 is fastened in the fastening work, the hook portion 90 is pulled by the band main body 52, and as a result, the groove width of the fitting groove 88 of the U-shaped hook portion 90 is increased, as shown in FIG. 6. Thus, when the band portion 80 is fastened, the distance between the wall portions 90*a*, 90*b* of the hook portion 90 becomes wider than the initial distance therebetween at the time when the second sidewall 38 was initially fitted therein. At this time, the hook portion 90 is plastically deformed. Therefore, when the fastening mechanism 32 is loosened, it is possible to easily separate the sensor holder 28 from the band portion 80. However, unless the fastening mechanism 32 is loosened, falling-off or loosening of the sensor holder 28 does not occur.

Incidentally, in the sensor fixture 10*a* according to the second embodiment, components which are the same or similar to those of the sensor fixture 10 according to the first embodiment provide the same or similar operational effects as those of the sensor fixture 10.

In FIG. 9A, a sensor fixture 10*b* according to a third embodiment of the present invention is attached to an outer peripheral surface 100 of a cylindrical (round shape) cylinder tube 98 of a fluid pressure cylinder 12*a*. This sensor fixture 10*b* is equipped with a sensor holder 28, a band portion 102, and a fastening mechanism 32. The sensor fixture 10*b* differs from the sensor fixture 10*a* according to the second embodiment in the structure of the band portion 102. A second end portion 82 of the band portion 102 has the same structure as the second end portion 82 of the band portion 80 of the sensor fixture 10*a* according to the second embodiment.

The structure of a hook member 104 of the band portion 102 partly differs from the structure of the hook member 86 in the second embodiment. That is, the hook member 104 has an extending portion 108 which extends from a hook portion 90 through a curved portion 106. In the state shown in FIG. 9A in which the sensor fixture 10*b* is attached to the cylinder tube 98, the extending portion 108 is in abutment with the outer peripheral surface 100 of the cylinder tube 98. The hook portion 90 of the hook member 104 is the same as the hook portion 90 of the hook member 86.

According also to the sensor fixture 10*b*, the second end portion 82 of the band portion 102 has the hook portion 90, and thus, as is the case with the sensor fixture 10*a* according to the second embodiment, it is possible to temporarily prevent the sensor holder 28 from falling off the band portion 102 during the work of winding the band portion 102 around the round shaped cylinder tube 98. Accordingly, it is possible to easily attach the sensor fixture 10*b* to the cylinder tube 98.

As shown in FIG. 9B, the sensor fixture 10b may be configured to be attached to a round fluid pressure cylinder 12b having a relatively small diameter.

Figure 10:
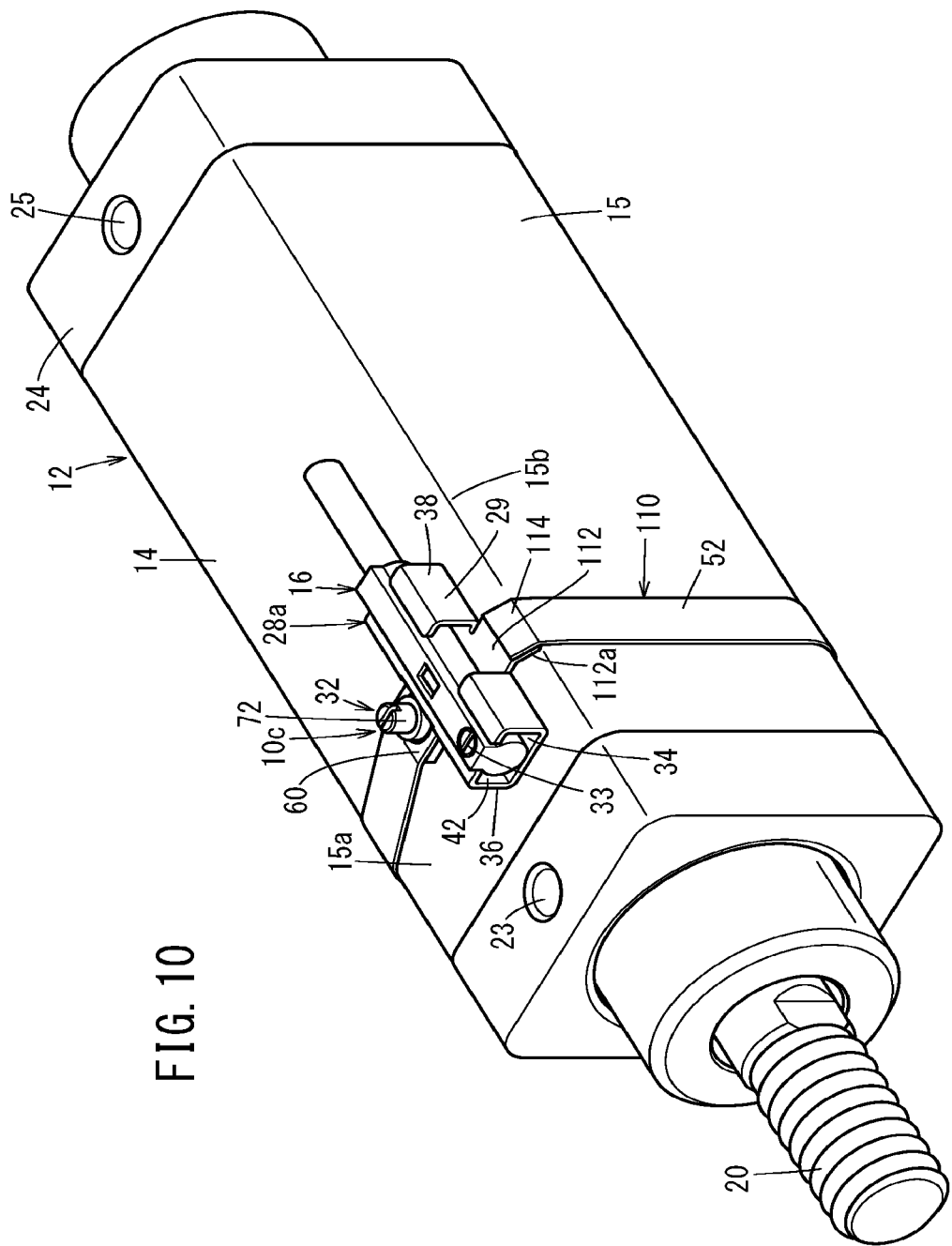
FIG. 10 is a perspective view of a fluid pressure cylinder with a sensor fixture according to a fourth embodiment of the present invention being attached thereto.

In FIG. 10, a sensor fixture 10c according to a fourth embodiment is attached to an outer peripheral surface 15 of a cylinder tube 14 of a fluid pressure cylinder 12. This sensor fixture 10c is equipped with a sensor holder 28a, a band portion 110, and a fastening mechanism 32. The sensor fixture 10c differs from the sensor fixture 10 according to the foregoing first embodiment in the structures of the sensor holder 28a and the band portion 110. The fastening mechanism 32 of the sensor fixture 10c is the same as the fastening mechanism 32 of the sensor fixture 10 according to the first embodiment.

The sensor holder 28a is equipped with a protruding piece 112 protruding laterally from a holder main body 29 which is made up of a first sidewall 36, a second sidewall 38 and a bottom wall 34. The protruding piece 112 extends laterally from a side of the bottom wall 34 where the second sidewall 38 is located. Further, the protruding piece 112 has a slant portion 112a which is slanted relative to the bottom wall 34 in an opposite direction (i.e., downward in FIG. 10) to a direction in which the second sidewall 38 protrudes from the bottom wall 34, and the slant portion 112a is abuttable against an outer peripheral corner portion 15b of the cylinder tube 14.

A second end portion 114, which is another band end portion of the band portion 110, is joined to the protruding piece 112. In FIG. 10, the joining is carried out with the second end portion 114 of the band portion 110 being put on a surface (i.e., an outer surface of the slant portion 112a) of the protruding piece 112. The second end portion 114 can be joined to the protruding piece 112, for example, by welding, adhesion or the like.

According to the sensor fixture 10c of the fourth embodiment, the sensor holder 28a and the band portion 110 are formed integrally with each other in advance, and hence, it is possible to attach the sensor fixture 10c to the cylinder tube 14 more easily. That is, merely by winding the band portion 110 around the outer peripheral surface 15 of the cylinder tube 14, next hooking the first end portion 60 of the band portion 110 on the first sidewall 36 of the sensor holder 28a, and then fastening the band portion 110 by the fastening mechanism 32, the sensor fixture 10c can be easily attached to the cylinder tube 14.

Further, in a tightening work for tightening the fastening screw 72 of the fastening mechanism 32, the protruding piece 112 with the slant portion 112a abuts against the outer peripheral corner portion 15b of the cylinder tube 14, and thus the sensor holder 28a can be stably held in place. Accordingly, during the tightening work, the sensor holder 28a can be prevented from being displaced with respect to the cylinder tube 14.

In FIG. 11A, a sensor fixture 10d according to a fifth embodiment of the present invention is attached to an outer peripheral surface 100 of a cylindrical (round-shaped) cylinder tube 98 of a fluid pressure cylinder 12b. This sensor fixture 10d is equipped with a sensor holder 28, a band portion 116 and a fastening mechanism 32. The sensor fixture 10d differs from the sensor fixture 10c (FIG. 9B) according to the foregoing third embodiment in the structure of the band portion 116.

A second end portion 118, which is another end portion of the band portion 116 is joined to an outer surface of a second sidewall 38 of the sensor holder 28, so that the sensor holder 28 and the band portion 116 are formed integrally. The second sidewall 38 and the second end portion 118 may be joined together by, for example, welding, adhesion, or the like.

In the sensor fixture 10d according to the fifth embodiment, the sensor holder 28 and the band portion 116 are formed integrally with each other in advance, and hence, it is possible to attach the sensor fixture 10d to the cylinder tube 98 more easily. That is, merely by winding the band portion 116 around the outer peripheral surface 100 of the cylinder tube 98, thereafter hooking a first end portion 60 of the band portion 116 on a first sidewall 36 of the sensor holder 28, and then fastening the band portion 116 by the fastening mechanism 32, it is possible to easily attach the sensor fixture 10d to the cylinder tube 98.

When trying to fix the sensor holder 28 to the cylindrical cylinder tube 98 by use of the band portion 116, the sensor holder 28 is apt to move in the arrow A direction in FIG. 11A. To prevent this, in the sensor fixture 10d, a protrusion 120 functioning as a stopper is provided on an inside surface side of the band portion 116 (i.e., on a side that faces the cylinder tube 98 when the band portion 116 is wound around the cylinder tube 98).

Specifically, the protrusion 120 is located between a portion of the band portion 116 wound around the cylinder tube 98 and the first end portion 60, and adjacent to the cylinder tube 98. By providing such a protrusion 120, it is possible to easily keep the sensor holder 28 in a right mounting position in the circumferential direction of the cylinder tube 98 (i.e., coincidence of the central position between the cylinder tube 98 and the sensor holder 28).

When the band portion 116 is viewed from the arrow B direction in FIG. 11A, the back-side shape of the protrusion 120 on the band portion 116 is in the form of a recess 122 depressed toward the cylinder tube 98, as shown in FIG. 11B. That is, a part of the band portion 116 is recessed to thereby form the protrusion 120 on the opposite side. Incidentally, the method of forming the protrusion 120 is not limited to the above manner. For example, another member may be joined to the inside surface of the band portion 116 by welding or the like to provide the protrusion 120.

As shown in FIG. 11A, another protrusion 124 may be provided on the inside surface on the second end portion 118 side of the band portion 116. In this case, specifically, the protrusion 124 is located between a portion of the band portion 116 wound around the cylinder tube 98 and the second end portion 118 and adjacent to the cylinder tube 98. By providing the protrusions 120, 124 at two places on the inside surface of the band portion 116, it becomes easier to position the sensor holder 28 on the circumference of the cylinder tube 98.

Figure 12:
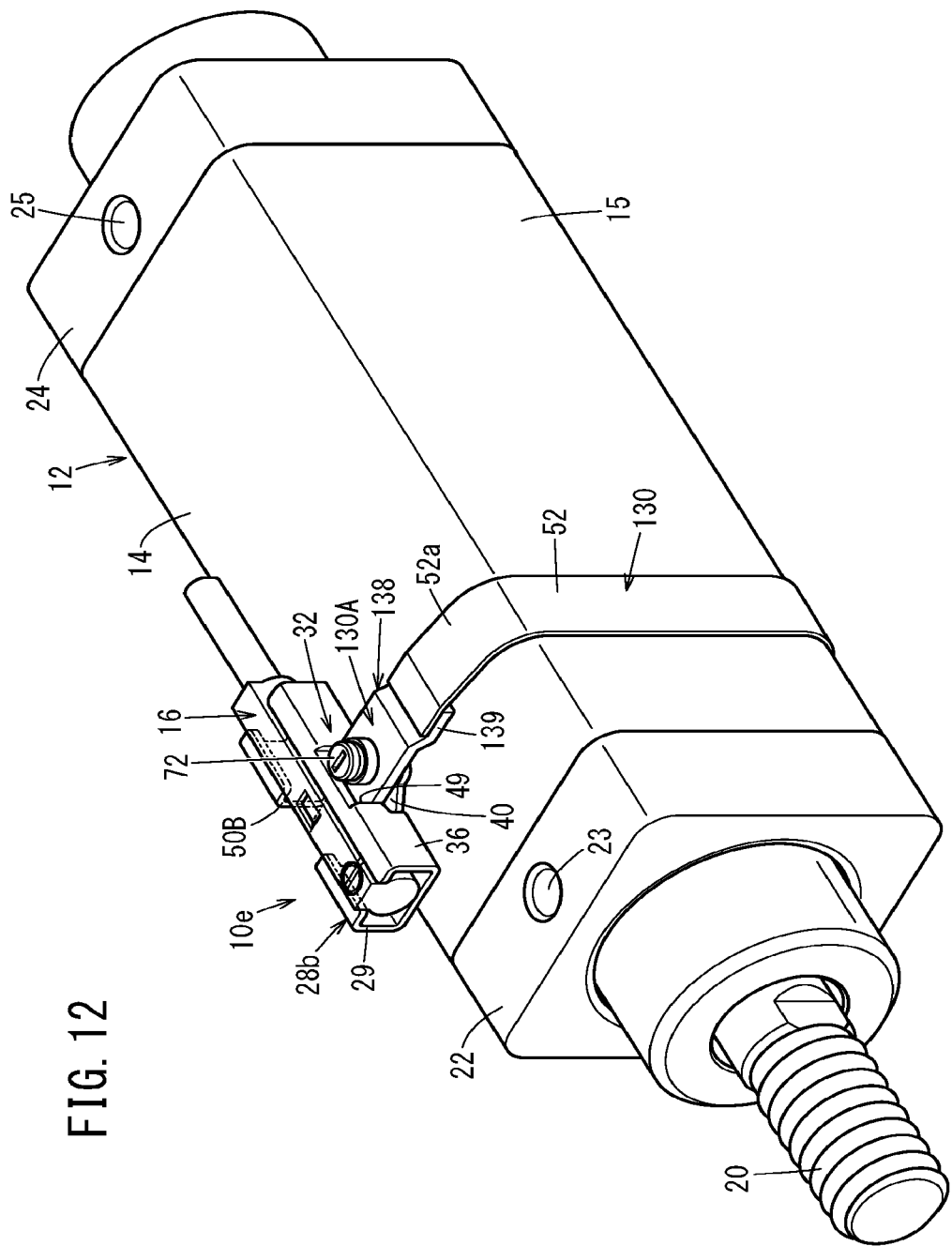
FIG. 12 is a perspective view of a fluid pressure cylinder with a sensor fixture according to a sixth embodiment of the present invention being attached thereto.

In FIG. 12, a sensor fixture 10e according to a sixth embodiment is attached to an outer peripheral surface 15 of a cylinder tube 14 of a fluid pressure cylinder 12. This sensor fixture 10e is equipped with a sensor holder 28b, a band portion 130, and a fastening mechanism 32. Although being the same in structure of the fastening mechanism 32 as the sensor fixture 10 according to the first embodiment, the sensor fixture 10e differs from the sensor fixture 10 according to the first embodiment in the structures of the sensor holder 28b and the band portion 130.

Figure 13:
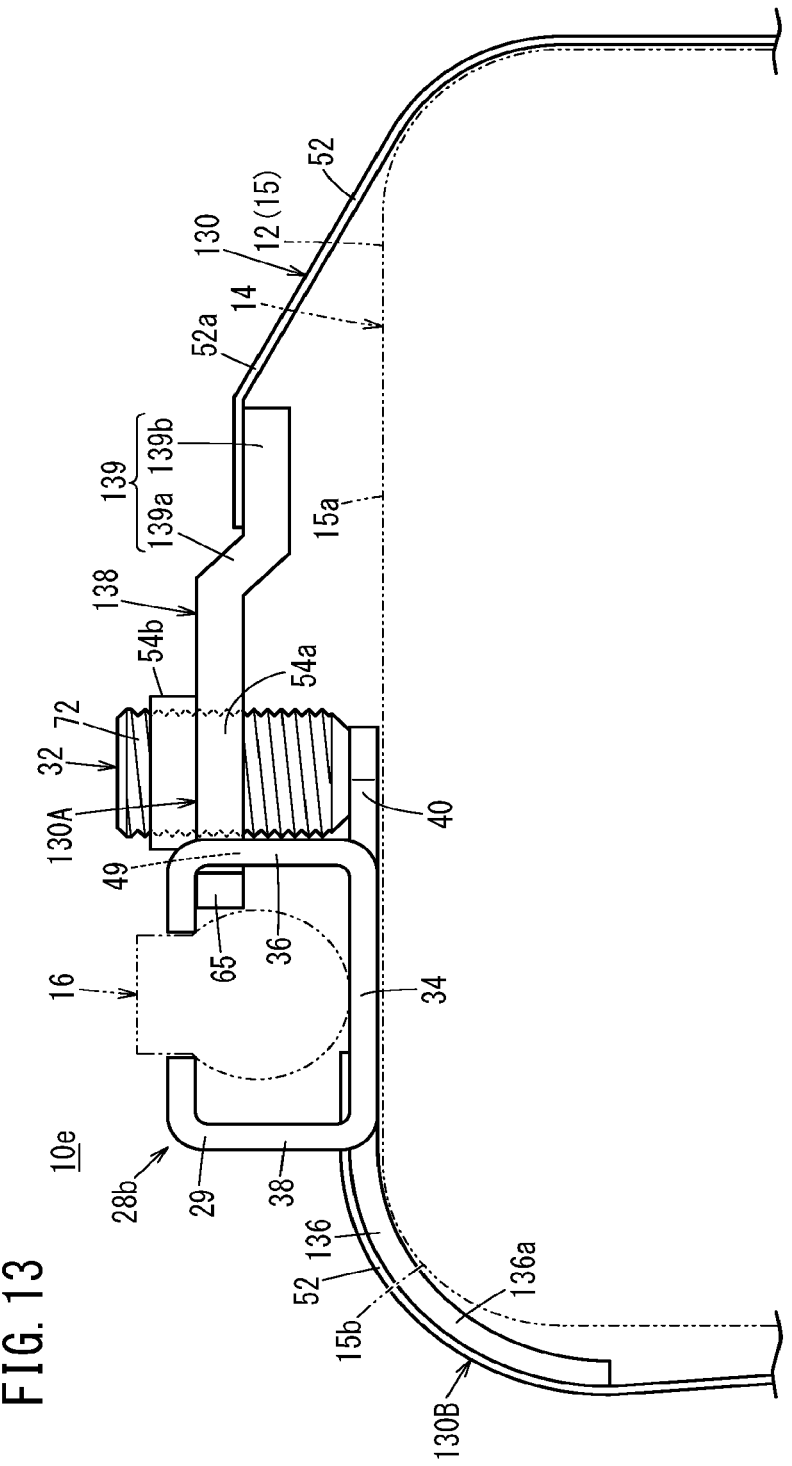
FIG. 13 is an enlarged view of main components of the sensor fixture shown in FIG. 12.

As shown in FIG. 13, the sensor holder 28b is equipped with a protruding piece 136 protruding laterally from a holder main body 29 which comprises a first sidewall 36, a second sidewall 38, and a bottom wall 34. The first sidewall 36 is provided with a connection hole 49 which is similar to the first connection hole 48 (refer to FIG. 3) of the sensor holder 28. The protruding piece 136 extends laterally from a side of the bottom wall 34 where the second sidewall 38 is located. Further, the protruding piece 136 has a curved portion 136a which is curved in an opposite direction (i.e., downward in FIG. 13) to a direction in which the second sidewall 38 protrudes from the bottom wall 34.

The curved portion 136a is curved in an arc shape along a curved shape of an outer peripheral corner portion 15b of the cylinder tube 14. In the state that the band portion 130 is attached to the outer peripheral surface 15 of the cylinder tube 14, the curved portion 136a abuts against the outer peripheral corner portion 15b of the cylinder tube 14 having a substantially rectangular shape in cross-section. With this structure, during a tightening work for tightening a fastening screw 72 of the fastening mechanism 32, the sensor holder 28b can be stably held in place. Accordingly, during the tightening work, the sensor holder 28b can be prevented from being displaced relative to the cylinder tube 14.

The band portion 130 has a first end portion 130A connectable to the sensor holder 28b and a second end portion 130B, and is configured to be wound around the outer peripheral surface 15 of the cylinder tube 14. The first end portion 130A is one end portion of the band portion 130 and is configured to be connectable to the first sidewall 36 of the sensor holder 28b.

The band portion 130 has a band main body 52, and a T-shaped nut member 138 which is overlapped with and connected to the one end portion of the band main body 52. The nut member 138 forms part of the first end portion 130A, which is one band end portion connected to the first sidewall 36 of the sensor holder 28b. The nut member 138 of the first end portion 130A is formed by adding an extending portion 139 to the nut member 54 shown in FIG. 2 or the like. The nut member 138 is configured to be insertable into the connection hole 49 provided on the first sidewall 36, and is also configured to be engageable with an insider surface of the first sidewall 36 through the pair of engaging protrusions 65 of the nut member 138.

The extending portion 139 extends from a plate-shaped base portion 54a toward a direction opposite to a side on which the engaging protrusions 65 are provided. The extending portion 139 has a bent portion 139a bent in a crank shape and a plate-shaped end portion 139b connected to the plate-shaped base portion 54a through the bent portion 139a. The height position of the plate-shaped end portion 139b is lowered, by a height difference caused by the bent portion 139a, from the height position of the plate-shaped base portion 54a toward the cylinder tube 14 (i.e., downward in FIG. 13). The one end portion of the band main body 52 is joined to the plate-shaped end portion 139b with the one end portion being put on the plate-shaped end portion 139b, by, for example, welding, adhesion, or the like.

Like this, because the nut member 138 has the extending portion 139 extending from the plate-shaped base portion 54a, it is possible to reduce the length of a portion 52a that is separated away from the cylinder tube 14 on the one end side of the band main body 52 in the state that the fastening screw 72 of the fastening mechanism 32 is tightened. That is, according to the band portion 130 of this structure, the length of the portion 52a which is separated away from the cylinder tube 14 on the one end side of the band main body 52 can be shortened in comparison with the structure in which the extending portion 139 is not provided. Accordingly, the band main body 52 can be set so as to have a length which facilitates the connection of the band main body 52 to the sensor holder 28b, and at the same time, a tightening margin of the band main body 52 can be secured easily. Thus, it is possible to cause the band main body 52 to generate suitable tension.

The other end portion of the band main body 52 forms the second end portion 130B of the band portion 130. The second end portion 130B is joined to a surface on the front side of the curved portion 136a of the sensor holder 28b with the second end portion 130B being put on the curved portion 136a, by, for example, welding, adhesion, or the like. Accordingly, the second end portion 130B is curved along the curved shape of the curved portion 136a.

Figure 14:
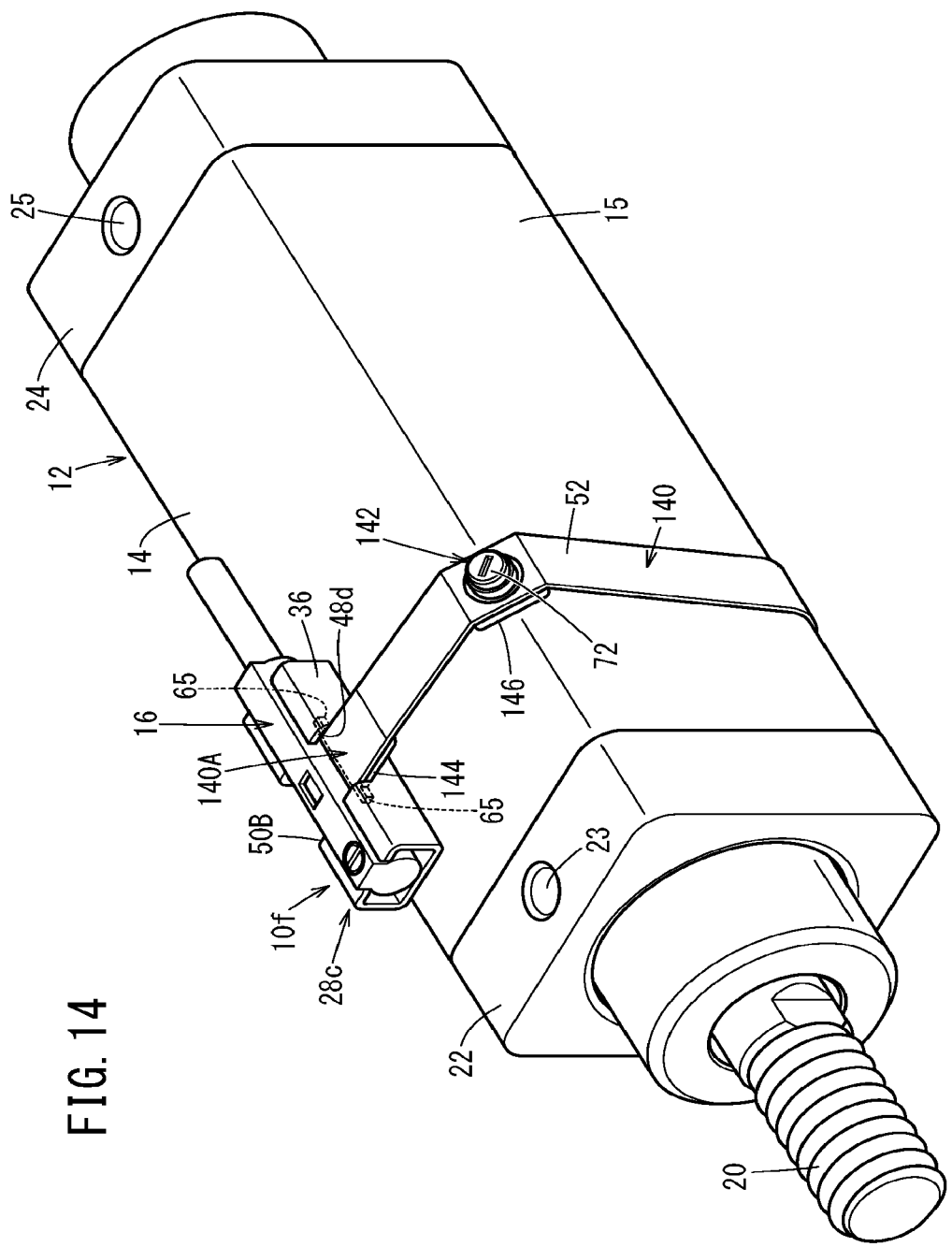
FIG. 14 is a perspective view of a fluid pressure cylinder with a sensor fixture according to a seventh embodiment of the present invention being attached thereto.

In FIG. 14, a sensor fixture 10f according to a seventh embodiment is attached to an outer peripheral surface 15 of a cylinder tube 14 of a fluid pressure cylinder 12. This sensor fixture 10f is equipped with a sensor holder 28c, a band portion 140, and a fastening mechanism 142. The sensor holder 28c is obtained by replacing the connection hole 49 in the sensor holder 28b (refer to FIG. 12) with a recessed cutout portion 48d opening upward.

The band portion 140 has a band main body 52, and a T-shaped reinforcing plate 144 provided at one end portion of the band main body 52. The reinforcing plate 144 has a structure in which the tubular portion 54b is omitted from the nut member 54 shown in FIG. 2 or the like. Therefore, the reinforcing plate 144 is provided with a pair of engaging protrusions 65 (protrusions). The one end portion of the band main body 52 is joined to the reinforcing plate 144 with the one end portion being put on the reinforcing plate 144 by, for example, welding, adhesion, or the like.

The reinforcing plate 144, together with the one end portion of the band main body 52, makes up a first end portion 140A, which is one end portion of the band portion 140. The first end portion 140A is engageable with a first sidewall 36 provided with the cutout portion 48d. A second end portion 140B, which is another end portion of the band portion 140, is configured to be similar to the second end portion 130B of the band portion 130.

On the outer peripheral surface 15 of the cylinder tube 14, the fastening mechanism 142 is disposed at a position which is displaced from the sensor holder 28c in the circumferential direction. In the seventh embodiment, the fastening mechanism 142 is provided at the position spaced from the first end portion 140A of the band portion 140, and is disposed so as to abut against an outer peripheral corner portion 15b of the cylinder tube 14 having a substantially rectangular shape in cross-section.

Figure 15:
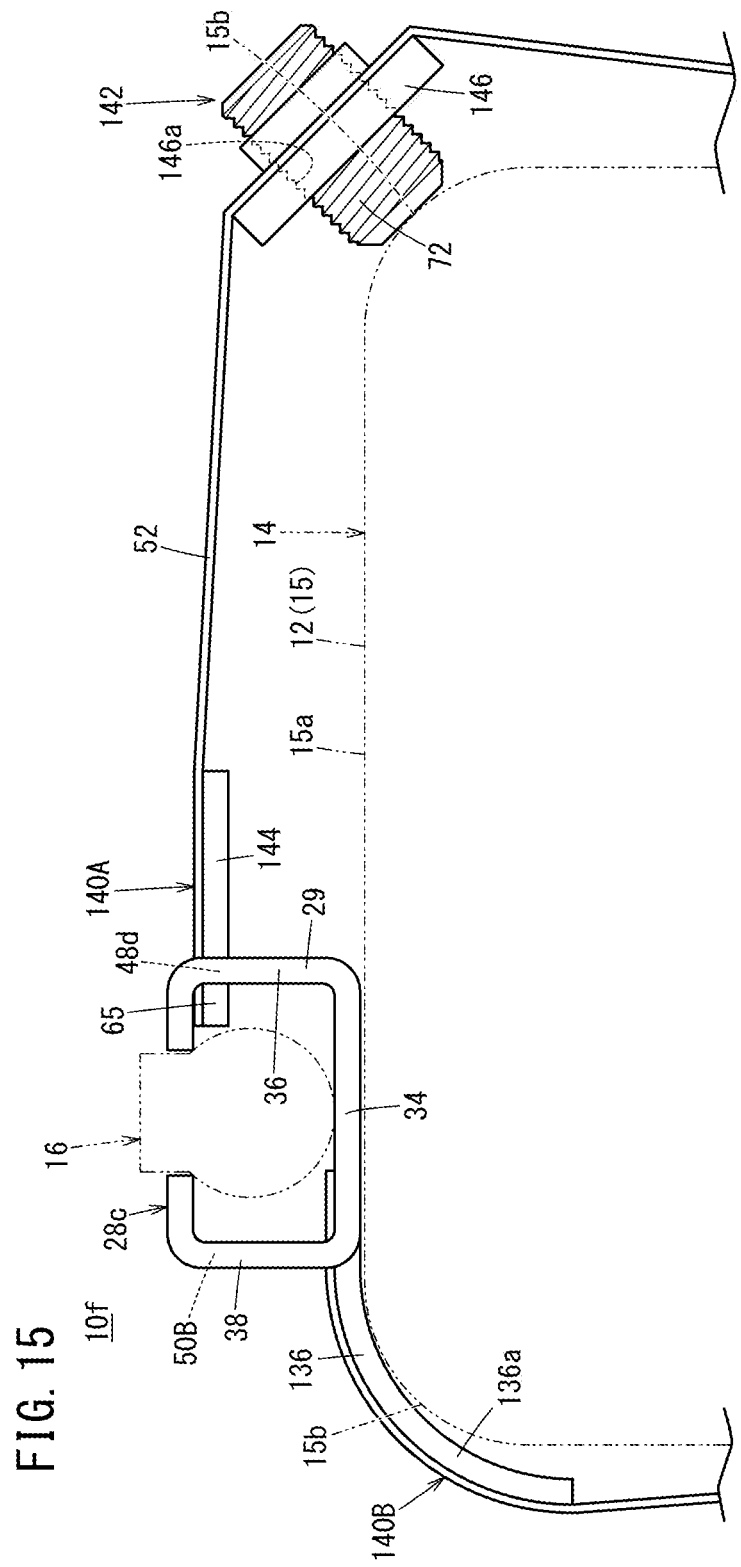
FIG. 15 is an enlarged view of main components of the sensor fixture shown in FIG. 14.

As shown in FIG. 15, the fastening mechanism 142 has a nut member 146 secured to the band main body 52 and having a female screw 146a formed therein, and a fastening screw 72 configured to be screw-engaged with the female screw 146a and abut against the outer peripheral corner portion 15b of the cylinder tube 14. Since the sensor fixture 10f is provided with the fastening mechanism 142 as constructed above, it is possible to improve the attachability to the cylinder tube 14.

Figure 16:
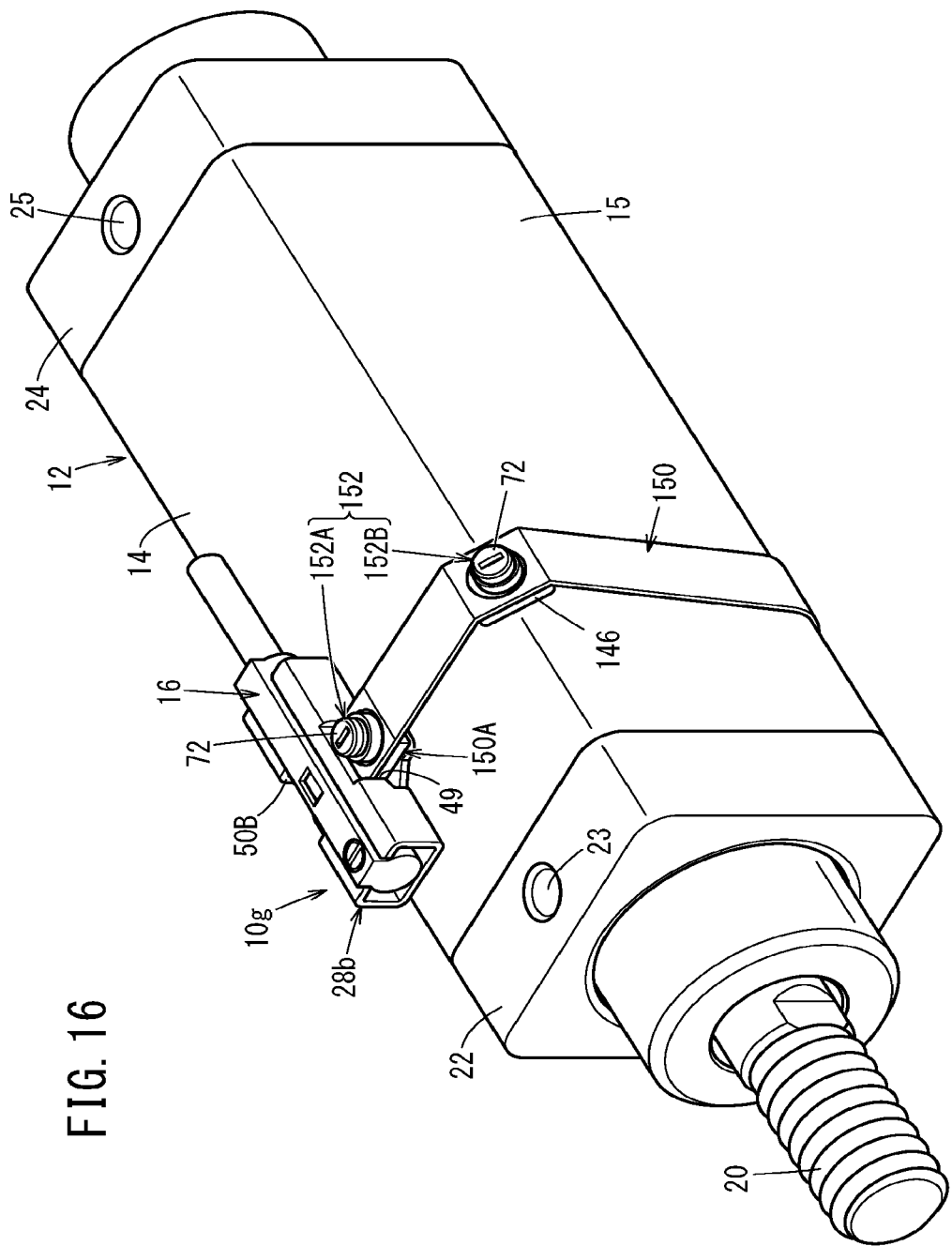
FIG. 16 is a perspective view of a fluid pressure cylinder with a sensor fixture according to an eighth embodiment of the present invention being attached thereto.
Figure 17:
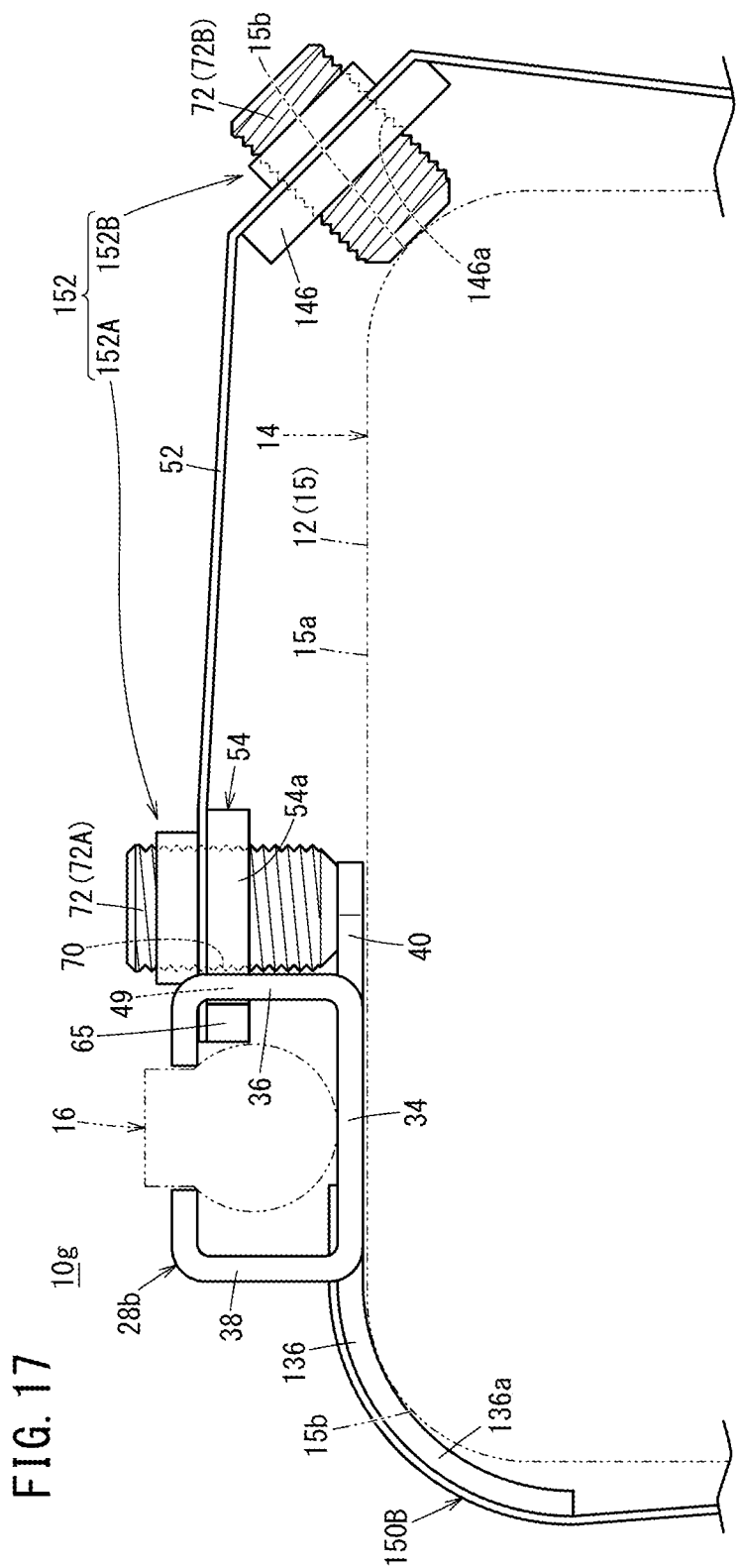
FIG. 17 is an enlarged view of main components of the sensor fixture shown in FIG. 16.

In FIG. 16 and FIG. 17, a sensor fixture 10g according to an eighth embodiment is attached to an outer peripheral surface 15 of a cylinder tube 14 of a fluid pressure cylinder 12. This sensor fixture 10g is equipped with a sensor holder 28b (identical with the sensor holder 28b of the sensor fixture 10e), a band portion 150, and a fastening mechanism 152. The fastening mechanism 152 has a first fastening mechanism 152A and a second fastening mechanism 152B.

The first fastening mechanism 152A is constructed similarly to the fastening mechanism 32 shown in FIG. 1 or the like. Therefore, a first end portion 150A, which is one end portion of the band portion 150, is constructed similarly to the first end portion 60 shown in FIG. 1 or the like. A second end portion 150B, which is another end portion of the band portion 150, is constructed similarly to the second end portion 130B of the band portion 130 shown in FIG. 13. The second fastening mechanism 152B is constructed similarly to the fastening mechanism 142 shown in FIG. 14 and FIG. 15.

In attaching the sensor fixture 10g constructed as above to the cylinder tube 14, a first fastening step is performed to tighten a fastening screw 72 (first fastening screw 72A) of the first fastening mechanism 152A provided on the sensor holder 28b side, whereby the sensor fixture 10g is temporarily fixed to the cylinder tube 14. Then, a second fastening step is performed to tighten the fastening screw 72 (second fastening screw 72B) of the second fastening mechanism 152B provided on an outer peripheral corner portion 15b side of the cylinder tube 14, whereby necessary and sufficient tension is applied to the band portion 150 (band main body 52).

As described above, by providing the first fastening mechanism 152A on the sensor holder 28b side and providing the second fastening mechanism 152B on the outer peripheral corner portion 15b side of the cylinder tube 14, it is possible to simultaneously achieve an improvement in attachability to the cylinder tube 14 and an improvement in fixing force (stability) of the attaching state.

Figure 18:
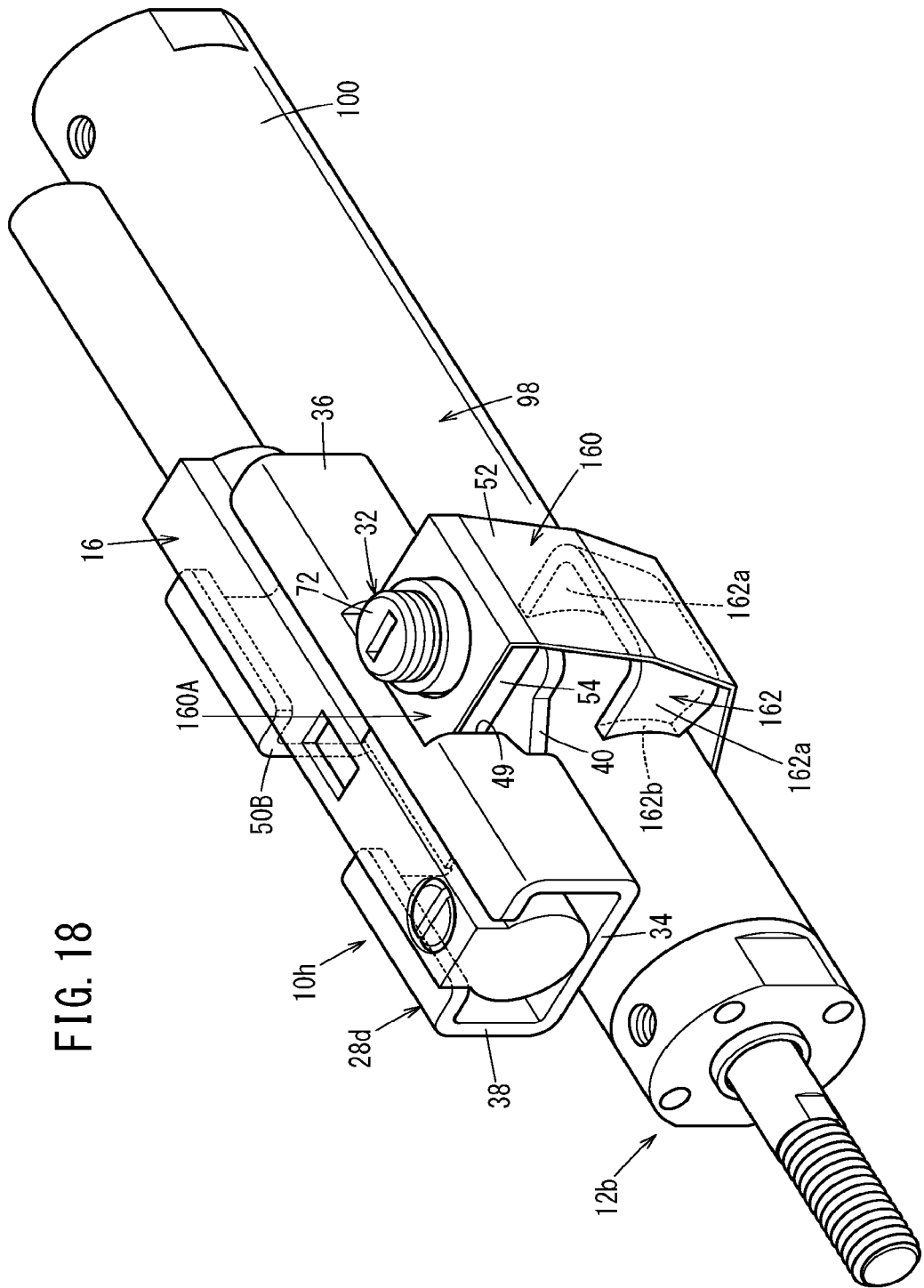
FIG. 18 is a perspective view of a fluid pressure cylinder with a sensor fixture according to a ninth embodiment of the present invention being attached thereto.
Figure 19:
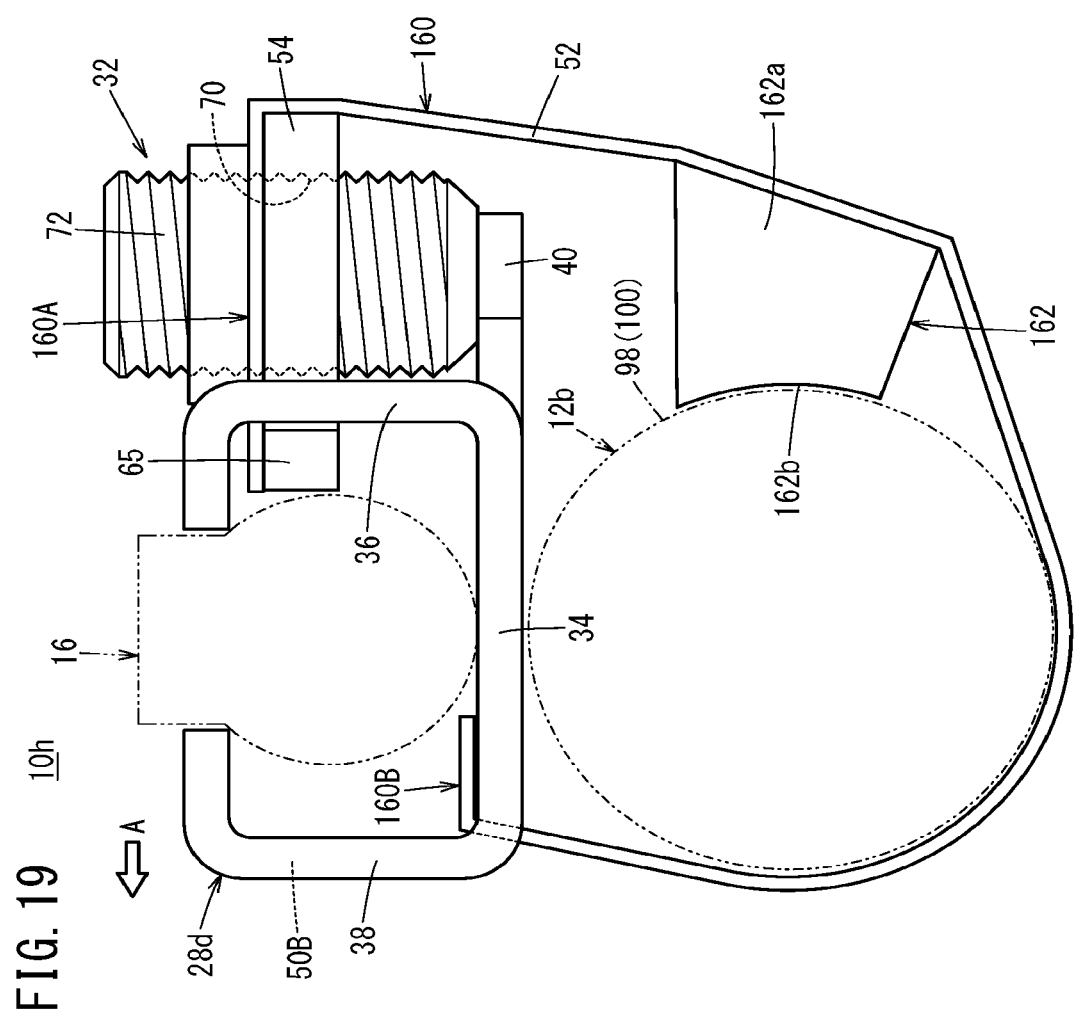
FIG. 19 is an enlarged view of main components of the sensor fixture shown in FIG. 18.

In FIG. 18 and FIG. 19, a sensor fixture 10h according to a ninth embodiment is attached to an outer peripheral surface 100 of a cylinder tube 98 of a fluid pressure cylinder 12b. This sensor fixture 10h is equipped with a sensor holder 28d, a band portion 160, and a fastening mechanism 32 (identical to the fastening mechanism 32 of the sensor fixture 10).

The sensor holder 28d is obtained by replacing the relatively shallow cutout portion 50A of the sensor holder 28 shown in FIG. 1 or the like with a cutout portion 50B which is cut out toward a bottom wall 34 to a greater (deeper) extent. The cutout portion 50B is an opening which opens at an upper portion and a side portion of the sensor holder 28d and extends to the bottom wall 34. Incidentally, it can also be said that the sensor holder 28d is in the form in which the curved portion 136a is omitted from the sensor holder 28b shown in FIG. 13.

The band portion 160 has a band main body 52 and a stopper member 162 (stopper). A first end portion 160A, which is one end portion of the band portion 160, has the same structure as the first end portion 60 (refer to FIG. 1) of the band portion 30. A second end portion 160B, which is another end portion of the band portion 160, is joined to the bottom wall 34 through the cutout portion 50B of the sensor holder 28d by, for example, welding, adhesion or the like.

The stopper member 162 is provided on an inside surface side (i.e., on a side that faces the cylinder tube 98 when the band portion 160 is wound around the cylinder tube 98) of the band portion 160 (band main body 52). The stopper member 162 protrudes from the band main body 52 toward the cylinder tube 98, and abuts against the outer peripheral surface 100 of the cylinder tube 98. The stopper member 162 is disposed across a flange portion 40 of the sensor holder 28d from a fastening screw 72 (i.e., under the flange portion 40 in FIG. 19).

In FIG. 18, the stopper member 162 is formed by bending a plate-shaped member into a U-shape. Thus, the stopper member 162 has a pair of plate-shaped protrusions 162a protruding toward the cylinder tube 98. Each of the plate-shaped protrusions 162a has, at a distal end thereof, an arc-shaped recess 162b which is recessed corresponding to the profile of the outer peripheral surface 100 (arc-shape outer peripheral surface) of the cylinder tube 98 having a circular shape in cross-section.

In the sensor fixture 10h according to the ninth embodiment, by providing the stopper member 162, it is possible to prevent the band portion 160 from being twisted when the fastening screw 72 is additionally tightened. Further, the stopper member 162 effectively prevents the sensor holder 28d from being moved in the arrow A direction in FIG. 19. Accordingly, it is possible to easily keep the sensor holder 28d in a right attaching position of the cylinder tube 98 in the circumferential direction (i.e., coincidence of the central position between the cylinder tube 98 and the sensor holder 28d).

Figure 20:
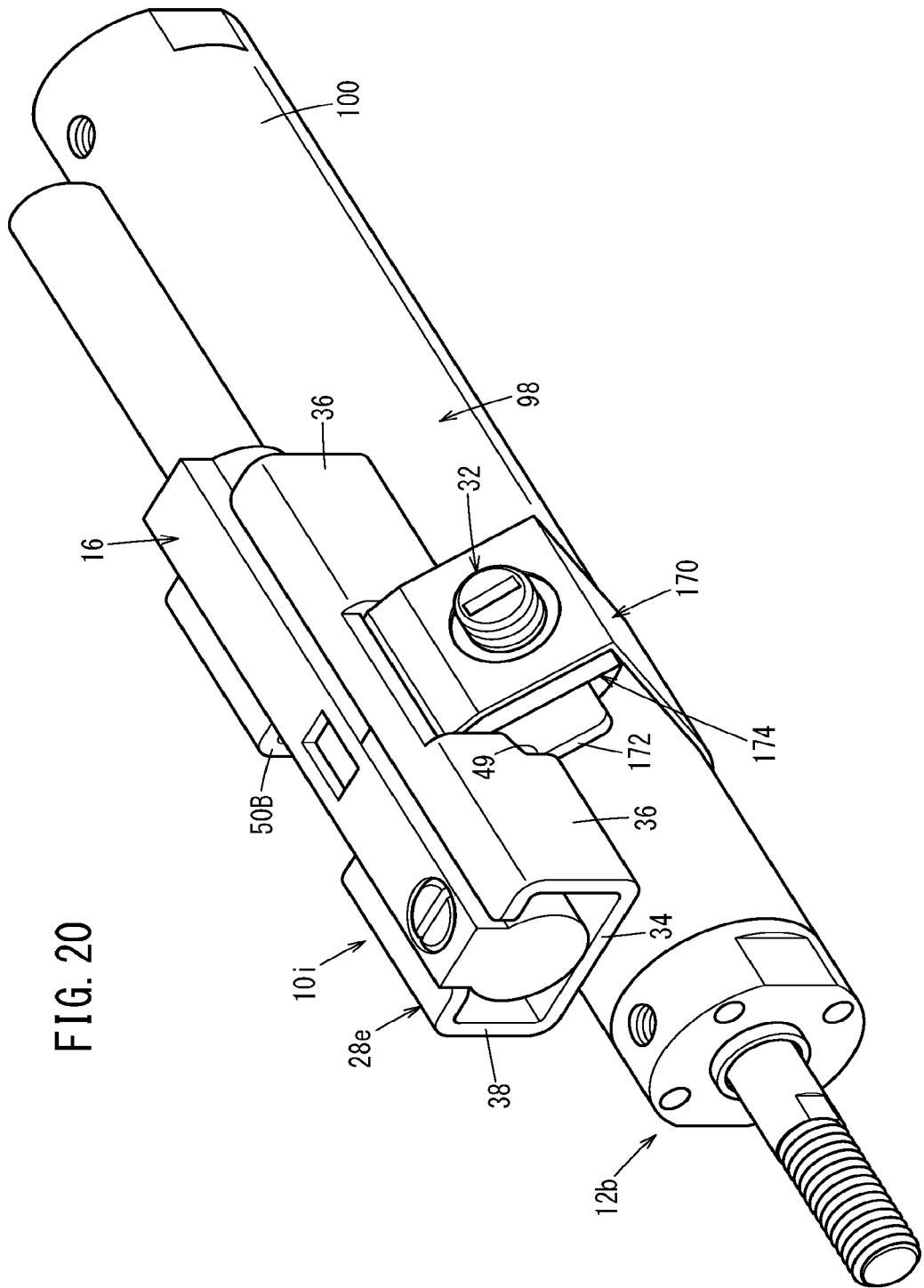
FIG. 20 is a perspective view of a fluid pressure cylinder with a sensor fixture according to a tenth embodiment of the present invention being attached thereto.

In FIG. 20 and FIG. 21, a sensor fixture 10i according to a tenth embodiment is attached to an outer peripheral surface 100 of a cylinder tube 98 of a fluid pressure cylinder 12b. This sensor fixture 10i is equipped with a sensor holder 28e, a band portion 170, and a fastening mechanism 32.

The sensor holder 28e is obtained by replacing the flange portion 40 formed to be flush with the bottom wall 34 in the aforementioned sensor holder 28d, with a flange portion 172 slanted relative to a bottom wall 34. The flange portion 172 is slanted in a direction (i.e., downward in FIG. 21) opposite to a direction in which a first sidewall 36 protrudes from the bottom wall 34. In a state that the sensor fixture 10i is attached to the cylinder tube 98, the flange portion 172 is in abutment against the outer peripheral surface 100 of the cylinder tube 98.

The band portion 170 has a band main body 52 and a nut member 174 provided at one end portion of the band main body 52. The nut member 174 is obtained by bending an engagement-side end portion (i.e., an end portion on a side provided with a pair of engaging protrusions 65) of the nut member 54 in the fastening mechanism 32 of the sensor fixture 10 shown in FIG. 1 or the like. The nut member 174, together with the one end portion of the band main body 52, forms a first end portion 170A, which is one end portion of the band portion 170. A second end portion 170B, which is another end portion of the band portion 170, is constructed similarly to the second end portion 160B of the band portion 160 (refer to FIG. 18 and FIG. 19).

In the state that the nut member 174 is engaged with the first sidewall 36 (the connection hole 49), a plate-shaped base portion 174a of the nut member 174 is slanted relative to the bottom wall 34 of the sensor holder 28e and faces the flange portion 172 in substantially parallel to each other.

According to the sensor fixture 10i of the tenth embodiment, the flange portion 172 abutting on the outer peripheral surface 100 of the cylinder tube 98 is slanted, and thus it is possible to provide the functionality of a stopper without providing the aforementioned stopper member 162 (refer to FIG. 18 and FIG. 19). That is, the flange portion 172 functions as a stopper. Accordingly, it is possible to reduce the size of the sensor fixture 10i in comparison with the sensor fixture 10h of the aforementioned ninth embodiment.

Further, in a case where the sensor fixture 10i is attached to a fluid pressure cylinder 12b already installed in a facility or the like of a user, it is possible to easily attach the sensor fixture 10i because there is no stopper protruding from the inside surface of the band portion 170. That is, even in a case that there is not any space for accommodating the stopper around the cylinder tube 98, it is possible to easily wind the band portion 170 around the cylinder tube 98.

As shown in FIG. 21, in the state that the sensor fixture 10i is attached to the cylinder tube 98, a portion 52d of the band main body 52 located between a portion 52b thereof secured to the nut member 174 and a portion 52c thereof contacting with and wound around the outer peripheral surface 100 of the cylinder tube 98 is slanted relative to a line L parallel to the axis a of the fastening screw 72. Thus, the band rigidity is increased against a force in a twisted direction generated by the rotation of the fastening screw 72. Accordingly, it is possible to prevent the band main body 52 from being twisted when the fastening screw 72 is additionally tightened.

The sensor fixture according to the present invention is not limited to the foregoing embodiments. The present invention can be various modified without departing from the scope of the present invention.

The invention claimed is:

1. A sensor fixture attaching a sensor to an outer peripheral surface of a cylinder tube, to sense a position in a longitudinal direction of the cylinder tube, the sensor fixture comprising:
   a rail-shaped sensor holder having a sensor insertion groove having a longitudinal direction extending in the longitudinal direction of the cylinder tube, the sensor insertion groove being configured to accommodate and hold the sensor in a position-adjustable manner and further having a first sidewall and a second sidewall facing each other, the first sidewall and the second sidewall extending in the longitudinal direction of the cylinder tube;
   a band portion having a band end portion extending in the longitudinal direction of the cylinder tube and connected to the sensor holder, the band portion being wound around the outer peripheral surface of the cylinder tube; and
   a fastening mechanism disposed on the outer peripheral surface of the cylinder tube and at a position shifted from the sensor holder, the fastening mechanism being fastened to the band portion;
   wherein the first sidewall includes a connection hole receiving the band end portion;
   the band end portion includes a protrusion engaged with an inside surface of the first sidewall;
   the sensor holder includes a bottom wall which connects the first sidewall and the second sidewall;
   the bottom wall has a cylinder abutment surface which abuts against the cylinder tube and a sensor arrangement surface which is opposite the cylinder abutment surface; and
   the first sidewall and the second sidewall protrude from respective opposing ends of the bottom wall and in a direction away from the cylinder abutment surface.

2. The sensor fixture according to claim 1, wherein:
   the band portion includes a first end portion being the band end portion, and a second end portion feeing another end portion of the band portion;
   the connection hole is a first connection hole;
   the protrusion is a first protrusion;
   the second sidewall includes a second connection hole receiving the second end portion; and
   the second end portion includes a second protrusion engaged with an inside surface of the second sidewall.

3. The sensor fixture according to claim 2, wherein:
   in a state that the sensor is attached to the sensor holder, the second end portion interferes with the sensor, so that the second end portion is prevented from coming off the sensor holder.

4. The sensor fixture according to claim 3, wherein:
   an upper end of the second sidewall includes an overhang portion protruding inward;

the second connection hole comprises a recessed cutout portion opening upward;
the overhang portion is divided by the cutout portion in a longitudinal direction of the sensor holder; and
the second protrusion includes a pair of engaging protrusions protruding toward both sides in a width direction of the band portion.

5. The sensor fixture according to claim 2, wherein:
the second end portion includes a book portion provided with a fitting groove allowing the second sidewall to be inserted and fitted thereinto;
one of mutually feeing wall portions of the fitting groove forms the second, protrusion;
an upper end of the second sidewall includes two overhang portions protruding inward and, extending in the longitudinal direction of tire sensor holder;
the second connection hole comprises a recessed cutout portion opening upward;
the two overhang portions are divided by tire cutout portion in a longitudinal direction of the sensor holder; and
the hook portion is engaged wife the cutout portion of the second sidewall.

6. The sensor fixture according to claim 5, wherein:
the hook portion is formed into a U-shape; and
an inside surface of the hook portion defines the fitting groove.

7. The sensor fixture according to claim 5, wherein:
at least one of the wall portions includes a protrusion protruding toward an inside of the fitting groove.

8. The sensor fixture according to claim 5, wherein:
an outer peripheral shape of the cylinder tube is substantially quadrangular;
the band portion includes a positioning portion winch is formed into a carved shape along an outer peripheral corner portion of the cylinder tube; and
the positioning portion extends from tire hook portion.

9. The sensor fixture according to claim 2, wherein:
an outer peripheral shape of the cylinder tube is substantially quadrangular; and
the second connection hole is provided at an upper portion of the second sidewall.

10. The sensor fixture according to claim 1, wherein:
another band end portion of the band portion is joined to the sensor holder on a side opposite to a tide where the first sidewall is located in the sensor holder.

11. The sensor fixture according to claim 10, wherein:
the sensor holder includes a protruding piece protruding laterally from a holder main body having the first sidewall and the second sidewall; and
the other band end portion is joined to the protruding piece.

12. The sensor fixture according to claim 11, wherein:
an outer peripheral shape of the cylinder tube is substantially quadrangular;
the sensor holder includes the bottom wall connecting lower ends of the first sidewall and the second sidewall; and
the protruding piece includes a slant portion slanted relative to the bottom wall and abuts against an outer peripheral corner portion of tire cylinder tube.

13. The sensor fixture according to claim 2, wherein:
the sensor holder includes the bottom wall connecting lower ends of the first sidewall and the second sidewall, and a flange portion protruding laterally from a side of the bottom wall where the first sidewall is located;

the first protrusion includes a pair of engaging protrusions protruding outward in a width direction of the band portion;

the first connection hole includes an insertion hole having, an opening width allowing a portion of the first end portion that is provided with the first protrusion to be inserted thereinto, and an engaging hole provided at a position spaced farther from the bottom wall than the insertion hole and having an opening width narrower than a width of the portion of the first end position that is provided with the first protrusion; and the fastening mechanism includes a female screw portion formed in the first end portion, and a fastening screw screw-engaged with the female screw portion and abut against the flange portion.

14. The sensor fixture according to claim 10, wherein:
the sensor holder includes the bottom wall connecting lower ends of the first sidewall and the second sidewall and a flange portion protruding laterally from a side of the bottom wall where the first sidewall is located;

the protrusion includes a part of engaging profusions protruding outward in a width direction of the band portion;

tire connection hole includes an insertion hole having an opening width allowing a portion of the band end portion that is provided with the protrusion to be inserted thereinto, and an engaging hole provided at a position spaced farther from the bottom wall than the insertion hole and having an opening width narrower than a width of the portion of the hand end portion that is provided with the protrusion; and the fastening mechanism, includes a female screw portion formed in the band end portion, and a fastening screw screw-engaged with the female screw portion and abut against the flange portion.

15. The sensor fixture according to claim 13, wherein:
the band end portion includes a nut member having the female screw portion formed therein; and
the nut member includes the pair of engaging protrusions.

16. The sensor fixture according to claim 1, wherein:
the fastening mechanism includes a nut member provided at the band end portion and having a female screw portion formed therein and a fastening screw screw-engaged with the female screw portion;

the nut member includes a plate-shaped base portion having the female screw portion formed therein, the protrusion provided at one end portion of the plate-shaped base portion, and an extending portion extending from another end portion of the plate-shaped base portion;

the band portion includes a belt-shaped band main body having flexibility; and one end portion of the band main body is fixed to fa extending portion.

17. The sensor fixture according to claim 1, wherein:
the band portion includes a belt-shaped band mam body having flexibility; and the fastening mechanism includes a nut member provided between one end portion and another end portion of the band main body and having a female screw portion formed therein, and a fastening screw screw-engaged with the female screw portion and abut against a corner portion of the cylinder tube having a rectangular shape in cross-section.

18. The sensor fixture according to claim 1, wherein:
the band portion includes a belt-shaped band main body having flexibility;

the fastening mechanism includes a first fastening mechanism and a second fastening mechanism;

the first fastening mechanism includes a first nut member provided at the band end portion and having a first female screw portion formed therein, and a first fastening screw screw-engaged with the first female screw portion; and the second, fastening mechanism includes a second nut member provided between one end portion and another end portion of the band main body and having a second female screw portion formed therein, and a second fastening screw screw-engaged with the second female screw portion and abut against a corner portion of the cylinder tube having a rectangular shape in cross-section.

19. The sensor fixture according to claim 1, wherein:
the band portion includes a belt-shaped band main body having flexibility, and a stopper protruding from an inside surface of the band main body and abutting against an outer peripheral surface of the cylinder tube.

20. The sensor fixture according to claim 1, wherein:
the band portion includes a belt-shaped band main body having flexibility, the sensor holder includes the bottom wall connecting lower ends of the first sidewall and the second sidewall, and a flange portion protruding laterally from a side of the bottom wall where the first sidewall is located, the flange portion being slanted relative to the bottom wall;

the fastening mechanism includes a nut member provided at one end portion of the band main body and having a female screw portion formed therein, and a fastening screw screw-engaged with the female screw portion; and in a stale that the nut member is engaged with the first sidewall, that the fastening screw is screw-engaged with the nut member, and that the fastening screw abuts against the flange portion, a portion of the band main body that is located between a portion thereof provided with the nut member and a portion thereof wound around an outer peripheral surface of the cylinder tube is slanted relative to a line parallel to an axis of the fastening screw.

* * * * *

UNITED STATES PATENT AND TRADEMARK OFFICE
CERTIFICATE OF CORRECTION

PATENT NO. : 11,105,350 B2  
APPLICATION NO. : 15/765292  
DATED : August 31, 2021  
INVENTOR(S) : Youji Takakuwa et al.

It is certified that error appears in the above-identified patent and that said Letters Patent is hereby corrected as shown below:

In the Claims

Column 22, Line 16, Claim 5, delete "and," and insert -- and --, therefor;

Column 22, Line 20, Claim 5, delete "tire" and insert -- the --, therefor;

Column 22, Line 23, Claim 5, delete "wife" and insert -- with --, therefor.

Signed and Sealed this  
Thirtieth Day of November, 2021

Drew Hirshfeld  
*Performing the Functions and Duties of the  
Under Secretary of Commerce for Intellectual Property and  
Director of the United States Patent and Trademark Office*